US011518952B2

(12) United States Patent
Ostvik et al.

(10) Patent No.: US 11,518,952 B2
(45) Date of Patent: Dec. 6, 2022

(54) MOBILE SOLID FUEL PRODUCTION SYSTEM

(71) Applicant: Ecogensus LLC, Hartford, CT (US)

(72) Inventors: Bjornulf Ostvik, Hartford, CT (US); Michael D. Lukas, Middletown, CT (US); Roberto Rondinelli, Vernon, CT (US)

(73) Assignee: Ecogensus LLC, West Hartford, CT (US)

( * ) Notice: Subject to any disclaimer, the term of this patent is extended or adjusted under 35 U.S.C. 154(b) by 0 days.

(21) Appl. No.: 17/092,067

(22) Filed: Nov. 6, 2020

(65) Prior Publication Data

US 2021/0139801 A1    May 13, 2021

Related U.S. Application Data

(60) Provisional application No. 62/934,911, filed on Nov. 13, 2019.

(51) Int. Cl.
*C10L 5/08* (2006.01)
*C10L 5/44* (2006.01)
(Continued)

(52) U.S. Cl.
CPC ............... *C10L 5/08* (2013.01); *C10L 5/445* (2013.01); *C10L 5/46* (2013.01); *C10L 5/48* (2013.01);
(Continued)

(58) Field of Classification Search
CPC .... C10L 5/08; C10L 5/445; C10L 5/46; C10L 5/48; C10L 9/083; C10L 2290/06;
(Continued)

(56) References Cited

U.S. PATENT DOCUMENTS 5,194,069 A * 3/1993 Someus ............... C10B 53/00
                                                              202/83
9,052,109 B1   6/2015 Fowler
(Continued)

FOREIGN PATENT DOCUMENTS

| EP | 3410052 | 12/2018 | |
| NL | 1039454 | 9/2013 | |
| WO | WO-2013064864 A1 * | 5/2013 | ............. C10B 49/10 |

OTHER PUBLICATIONS

International Search Report and Written Opinion in International Appln. No. PCT/US2020/059487, dated Feb. 24, 2021, 14 pages.

*Primary Examiner* — Latosha Hines
(74) *Attorney, Agent, or Firm* — Fish & Richardson P.C.

(57) ABSTRACT

A fuel production system includes a first modular unit and a second modular unit. The first modular unit includes a first housing, a process vessel, an agitator rotor assembly, a first drivetrain, an extrusion screw, a second drivetrain, a first separation vessel, and a product shaping system. The second modular unit includes a second housing, a thermal fluid heater system, a condenser, a second separation vessel, and a vacuum pump. The second modular unit is configured to be coupled to the first modular unit. At least a portion of each of the process vessel, the agitator rotor assembly, the first drivetrain, the extrusion screw, the second drivetrain, the first separation vessel, and the product shaping system are contained in the first housing. At least a portion of each of the thermal fluid heater system, the condenser, the second separation vessel, and the vacuum pump are contained in the second housing.

13 Claims, 17 Drawing Sheets

(51) Int. Cl.
*C10L 5/46* (2006.01)
*C10L 5/48* (2006.01)
*C10L 9/08* (2006.01)

(52) U.S. Cl.
CPC ........... *C10L 9/083* (2013.01); *C10L 2290/06* (2013.01); *C10L 2290/08* (2013.01); *C10L 2290/24* (2013.01); *C10L 2290/32* (2013.01); *C10L 2290/50* (2013.01); *C10L 2290/54* (2013.01); *C10L 2290/562* (2013.01); *C10L 2290/565* (2013.01); *C10L 2290/567* (2013.01)

(58) Field of Classification Search
CPC ............. C10L 2290/08; C10L 2290/24; C10L 2290/32; C10L 2290/50; C10L 2290/54; C10L 2290/562; C10L 2290/565; C10L 2290/567; C10L 5/406; C10L 2290/02; C10L 2290/28; C10L 2290/30
See application file for complete search history.

(56) References Cited

U.S. PATENT DOCUMENTS

| | | | |
|---|---|---|---|
| 10,280,377 B1 | 5/2019 | Nestler | |
| 2010/0281759 A1* | 11/2010 | Yanik | C10L 9/083 |
| | | | 422/198 |
| 2015/0211684 A1* | 7/2015 | Santos | F17C 11/007 |
| | | | 137/1 |

* cited by examiner

MOBILE SOLID FUEL PRODUCTION SYSTEM

CROSS-REFERENCE TO RELATED APPLICATION

This application claims the benefit of priority to U.S. Provisional Application No. 62/934,911, filed on Nov. 13, 2019, and entitled "SOLID FUEL PRODUCTION," the contents of which are hereby incorporated by reference.

TECHNICAL FIELD

This disclosure relates to a mobile system for producing solid compositions. In particular, a mobile system for producing solid fuel compositions from solid wastes is disclosed herein.

BACKGROUND

It is desirable to manage solid wastes, such as agricultural wastes, municipal wastes (for example, from residential, institutional, and commercial sources), and other wastes such as sewage sludge. As landfills reach and exceed capacity worldwide, and as the solid waste industry and societies generally limit the use of landfills, methods of managing solid wastes have been developed to reduce the volume of solid waste introduced into landfills. Recycling of metals, plastics, and paper products, as well as composting organic matter are methods of reducing the overall volume of solid wastes going to landfills. Waste-to-energy processes have also been developed to convert the energy content of solid wastes into a more usable form, such as electrical power.

SUMMARY

This disclosure relates to a mobile system for producing compositions, such as solid fuel compositions, having a desired homogeneity, density and/or moisture content. In particular, some embodiments provided herein include a mobile system for producing solid fuel compositions from solid wastes. For example, the mobile systems provided herein can produce a desired composition (e.g., a solid fuel composition) from feedstock materials (e.g., solid wastes and other wastes).

The system provided herein can comprise a feedstock materials processor that is fully integrated and adapted to fit into one or more shipping containers (may also be referred to a "module"). In some embodiments, the system can be fit into a single shippable container. In some embodiments, the shipping container can have a dimension of about 20 feet or about 40 feet, either standard or high cube. In various embodiments, the system provided herein is sized and shaped to fit within a shipping container, and is within standard weight limits.

In some embodiments, the entire volume of the system (or any one or more components provided therein, for example, a vessel within the system) is about 5,000 liters to about 6,000 liters (e.g., from about 2,000 liters to about 8,000 liters, from about 4,000 liters to about 7,000 liters, no more than 5,500 liters, no more than 6,000 liters, no more than 7,000 liters, greater than 1,000 liters, greater than 2,000 liters, greater than 3,000 liters, greater than 4,000 liters, or greater than 5,000 liters).

In some embodiments, the system provided herein is an integrated system that may comprise a single module, or multiple modules (e.g., a "multi-modular" system). A multi-module system can include two or more modules (e.g., two, three, four, five, six, seven, eight, nine, ten, or more modules). In various implementations, a multi-modular system can be configured for disassembly during transportation, and assembly (or re-assembly) at a desired processing site. The multi-modular system can be configured, during assembly, for connection of one or more components and/or structures from at least two different modules.

In some embodiments, the system provided herein comprises a process vessel (also may be referred to as a process chamber, a mixing vessel, or a mixing container) configured for processing solid materials into a solid fuel. The system can also include one or more additional components, including a thermal source, a condensate recovery system, a vacuum system, and/or mechanical processing motors, enclosed within the system.

The process vessel provided herein may be configured to operate at a suitable pressure range and/or temperature range. In some embodiments, the process vessel can be designed to operate at about 50 torr, or from about 30 torr to about 70 torr. In some embodiments, the process vessel can be designed to operate at a temperature of about 300° C. or greater (e.g., 350° C., 400° C., 450° C., 500° C., or greater). In some embodiments, the process vessel can be designed to operate at a temperature from about 140° C. to about 160° C., about 160° C. to about 200° C., about 200° C. to about 250° C., or about 250° C. to about 300° C. In some embodiments, the process vessel is configured heat its interior using a heated medium (e.g., an oil) at about 650° F., or from about 600° F. to about 700° F.

In a first general aspect, a fuel production system includes a first modular unit and a second modular unit. The first modular unit includes a first housing, a process vessel, an agitator rotor assembly, a first drivetrain, an extrusion screw, a second drivetrain, a first separation vessel, and a product shaping system. The second modular unit includes a second housing, a thermal fluid heater system, a condenser, a second separation vessel, and a vacuum pump. The second modular unit is configured to be coupled to the first modular unit. The agitator rotor assembly passes through the process vessel. The first drivetrain is coupled to the agitator rotor assembly. The first drivetrain is configured to rotate the agitator rotor assembly. The extrusion screw passes through the process vessel. The second drivetrain is coupled to the extrusion screw. The second drivetrain is configured to rotate the extrusion screw. The first separation vessel is in fluid communication with the process vessel. At least a portion of each of the process vessel, the agitator rotor assembly, the first drivetrain, the extrusion screw, the second drivetrain, the first separation vessel, and the product shaping system are contained in the first housing. The thermal fluid heater system is configured to be in fluid communication with the process vessel. The condenser is configured to be in fluid communication with the first separation vessel. The second separation vessel is in fluid communication with the condenser. The vacuum pump is in fluid communication with the second separation vessel. At least a portion of each of the thermal fluid heater system, the condenser, the second separation vessel, and the vacuum pump are contained in the second housing. The above description of the modular units are non-limiting examples. In some embodiments, portions or full assemblies of any one or more of the modular unit components, including a process vessel, an agitator rotor assembly, a first drivetrain, an extrusion screw, a second drivetrain, a first separation vessel, and a product shaping, a thermal fluid heater system, a condenser, a second separation vessel, and a vacuum pump, or combinations thereof, can be included in the first modular unit, second modular unit, or both. In some cases, any one or more modular unit components can be omitted or other components can be included.

Implementations of the first general aspect can include one or more of the following features.

In some embodiments, the thermal fluid heater system includes an expansion tank, heater, deaerator, and a conduit system.

In some embodiments, the expansion tank is configured to contain nitrogen gas and a thermal fluid.

In some embodiments, the vacuum pump is configured to move fluid from the process vessel to the first separation vessel, move fluid from the first separation vessel to the condenser, and move fluid from the condenser to the second separation vessel.

In some embodiments, the system weighs about 80,000 lbs or less.

In some embodiments, the system includes a skid. In some embodiments, the process vessel, the product shaping system, and the thermal fluid heater system are coupled to the skid.

In some embodiments, the system is configured to be transported from a first location to a second location.

In some embodiments, the system is configured to operate while the first modular unit is contained within the first housing and the second modular unit is contained within the second housing.

In some embodiments, each modular unit has dimensions of approximately 20'×8'×8'.

In some embodiments, the product shaping system includes an extrusion barrel, a reducer, and a die. In some embodiments, the extrusion barrel is coupled to the process vessel. In some embodiments, the extrusion barrel defines multiple annular spaces that are configured to allow a solid fuel composition to pass through the extrusion barrel. In some embodiments, the reducer is coupled to the extrusion barrel. In some embodiments, the reducer includes a thermal fluid piping configured to flow a thermal fluid, thereby providing heat to the solid fuel composition. In some embodiments, the die is coupled to the reducer. In some embodiments, the die defines multiple openings that are configured to shape the solid fuel composition as the solid fuel composition is extruded through the die.

In a second general aspect, a modular fuel production system includes modules. Each module includes a fuel production system. The fuel production system includes a first modular unit and a second modular unit. The first modular unit includes a first housing, a process vessel, an agitator rotor assembly, a first drivetrain, an extrusion screw, a second drivetrain, a first separation vessel, and a product shaping system. The second modular unit includes a second housing, a thermal fluid heater system, a condenser, a second separation vessel, and a vacuum pump. The second modular unit is configured to be coupled to the first modular unit. The agitator rotor assembly passes through the process vessel. The first drivetrain is coupled to the agitator rotor assembly. The first drivetrain is configured to rotate the agitator rotor assembly. The extrusion screw passes through the process vessel. The second drivetrain is coupled to the extrusion screw. The second drivetrain is configured to rotate the extrusion screw. The first separation vessel is in fluid communication with the process vessel. At least a portion of each of the process vessel, the agitator rotor assembly, the first drivetrain, the extrusion screw, the second drivetrain, the first separation vessel, and the product shaping system are contained in the first housing. The thermal fluid heater system is configured to be in fluid communication with the process vessel. The condenser is configured to be in fluid communication with the first separation vessel. The second separation vessel is in fluid communication with the condenser. The vacuum pump is in fluid communication with the second separation vessel. At least a portion of each of the thermal fluid heater system, the condenser, the second separation vessel, and the vacuum pump are contained in the second housing. Each module is configured to be removably coupled to one or more other modules.

Implementations of the second general aspect can include one or more of the following features.

In some embodiments, the thermal fluid heater system includes an expansion tank, heater, deaerator, and a conduit system.

In some embodiments, the expansion tank is configured to contain nitrogen gas and a thermal fluid.

In some embodiments, the vacuum pump is configured to move fluid from the process vessel to the first separation vessel, move fluid from the first separation vessel to the condenser, and move fluid from the condenser to the second separation vessel.

In some embodiments, the system weighs about 80,000 lbs or less.

In some embodiments, the system includes a skid. In some embodiments, the process vessel, the product shaping system, and the thermal fluid heater system are coupled to the skid.

In some embodiments, the system is configured to be transported from a first location to a second location.

In some embodiments, the system is configured to operate while the first modular unit is contained within the first housing and the second modular unit is contained within the second housing.

In some embodiments, each modular unit has dimensions of approximately 20'×8'×8'.

In some embodiments, the product shaping system includes an extrusion barrel, a reducer, and a die. In some embodiments, the extrusion barrel is coupled to the process vessel. In some embodiments, the extrusion barrel defines multiple annular spaces that are configured to allow a solid fuel composition to pass through the extrusion barrel. In some embodiments, the reducer is coupled to the extrusion barrel. In some embodiments, the reducer includes a thermal fluid piping configured to flow a thermal fluid, thereby providing heat to the solid fuel composition. In some embodiments, the die is coupled to the reducer. In some embodiments, the die defines multiple openings that are configured to shape the solid fuel composition as the solid fuel composition is extruded through the die.

In a third general aspect, a method includes coupling a first modular unit to a second modular unit. The first modular unit includes a process vessel, an agitator rotor assembly, a first drivetrain, an extrusion screw, a second drivetrain, a first separation vessel, and a product shaping system. The second modular unit includes a thermal fluid heater system, a condenser, a second separation vessel, and a vacuum pump. The agitator rotor assembly passes through the process vessel. The first drivetrain is coupled to the agitator rotor assembly. The extrusion screw passes through the process vessel. The second drivetrain is coupled to the extrusion screw. The first separation vessel is in fluid communication with the process vessel. The second separation vessel is in fluid communication with the condenser. The vacuum pump is in fluid communication with the second separation vessel. Coupling the first modular unit to the second modular unit includes fluidly coupling the thermal fluid heater system of the second modular unit to at least one of the process vessel or the agitator rotor assembly of the first modular unit. Coupling the first modular unit to the second modular unit includes fluidly coupling the first separation vessel of the first modular unit to the condenser of the second modular unit.

Implementations of the third general aspect can include one or more of the following features.

In some embodiments, the first modular unit includes a first housing. In some embodiments, at least a portion of each of the process vessel, the agitator rotor assembly, the first drivetrain, the extrusion screw, the second drivetrain, the first separation vessel, and the product shaping system are contained in the first housing. In some embodiments, the second modular unit includes a second housing. In some embodiments, at least a portion of each of the thermal fluid heater system, the condenser, the second separation vessel, and the vacuum pump are contained in the second housing.

In some embodiments, the method includes inputting a solid waste mixture into the process vessel. In some embodiments, the method includes producing a solid fuel composition from the solid waste mixture. In some embodiments, producing the solid fuel composition includes rotating the agitator rotor assembly using the first drivetrain, thereby agitating the solid waste mixture within the process vessel. In some embodiments, producing the solid fuel composition includes providing heat to the solid waste mixture within the process vessel. In some embodiments, the method includes extruding the solid fuel composition from the process vessel. In some embodiments, extruding the solid fuel composition includes rotating the extrusion screw using the second drivetrain. In some embodiments, extruding the solid fuel composition includes shaping the solid fuel composition using the product shaping system.

In some embodiments, providing heat to the solid waste mixture includes flowing a thermal fluid from the thermal fluid heater system to at least one of the process vessel or the agitator rotor assembly.

In some embodiments, the method includes flowing the thermal fluid from at least one of the process vessel or the agitator rotor assembly to the thermal fluid heater system.

In some embodiments, the method includes flowing a fluid stream from the process vessel to the first separation vessel. In some embodiments, the method includes separating phases of the fluid stream using the first separation vessel. In some embodiments, the method includes flowing the fluid stream from the first separation vessel to the condenser. In some embodiments, the method includes cooling the fluid stream using the condenser. In some embodiments, the method includes flowing the fluid stream from the condenser to the second separation vessel. In some embodiments, the method includes separating phases of the fluid stream using the second separation vessel. In some embodiments, the vacuum pump facilitates the flow of the fluid stream from the process vessel to the first separation vessel. In some embodiments, the vacuum pump facilitates the flow of the fluid stream from the first separation vessel to the condenser. In some embodiments, the vacuum pump facilitates the flow of the fluid stream from the condenser to the second separation vessel.

In some embodiments, the product shaping system includes an extrusion barrel, a reducer, and a die. In some embodiments, the extrusion barrel is coupled to the process vessel. In some embodiments, the extrusion barrel defines multiple annular spaces that are configured to allow the solid fuel composition to pass through the extrusion barrel. In some embodiments, the reducer is coupled to the extrusion barrel. In some embodiments, the die is coupled to the reducer. In some embodiments, the die defines multiple openings. In some embodiments, shaping the solid fuel composition includes passing the solid fuel composition through the annular spaces of the extrusion barrel, the reducer, and the die, thereby shaping the solid fuel composition by the openings defined by the die.

In some embodiments, the reducer includes a thermal fluid piping. In some embodiments, shaping the solid fuel composition includes flowing the thermal fluid through the thermal fluid piping, thereby heating the solid fuel composition as the solid fuel composition passes through the reducer.

In a fourth general aspect, a fuel production system includes a first modular unit. The first modular unit includes a first housing, a process vessel, an agitator rotor assembly, a first drivetrain, an extrusion screw, a second drivetrain, a first separation vessel, and a product shaping system. The process vessel is configured to receive a solid mixture. The agitator rotor assembly passes through the process vessel. The agitator rotor assembly is configured to agitate the solid mixture within the process vessel in response to being rotated. The agitator rotor assembly defines an inner bore configured to receive a thermal fluid and flow the thermal fluid through at least a portion of the agitator rotor assembly. The first drivetrain is coupled to the agitator rotor assembly. The first drivetrain is configured to rotate the agitator rotor assembly. The extrusion screw passes through the process vessel. The extrusion screw is configured to extrude a solid fuel composition from the process vessel in response to being rotated. The solid fuel composition is formed from the solid mixture. The second drivetrain is coupled to the extrusion screw. The second drivetrain is configured to rotate the extrusion screw. The first separation vessel is in fluid communication with the process vessel. The product shaping system includes an extrusion barrel, a reducer, and a die. The extrusion barrel is coupled to the process vessel. The extrusion barrel defines multiple annular spaces that are configured to allow the solid fuel composition to pass through the extrusion barrel. The reducer is coupled to the extrusion barrel. The reducer includes a thermal fluid piping that is configured to flow the thermal fluid, thereby providing heat to the solid fuel composition. The die is coupled to the reducer. The die defines multiple openings that are configured to shape the solid fuel composition as the solid fuel composition is extruded through the die. At least a portion of each of the process vessel, the agitator rotor assembly, the first drivetrain, the extrusion screw, the second drivetrain, the first separation vessel, and the product shaping system are contained in the first housing.

Implementations of the fourth general aspect can include one or more of the following features.

In some embodiments, the fuel production system includes a second modular unit that is configured to be coupled to the first modular unit. In some embodiments, the second modular unit includes a second housing, a thermal fluid heater system, a condenser, a second separation vessel, and a vacuum pump. In some embodiments, the thermal fluid heater system is configured to be in fluid communication with the process vessel. In some embodiments, the condenser is configured to be in fluid communication with the first separation vessel. In some embodiments, the second separation vessel is in fluid communication with the condenser. In some embodiments, the vacuum pump is in fluid communication with the second separation vessel. In some embodiments, at least a portion of each of the thermal fluid heater system, the condenser, the second separation vessel, and the vacuum pump are contained in the second housing.

In some embodiments, the thermal fluid heater system includes an expansion tank, heater, deaerator, and a conduit system.

In some embodiments, the expansion tank is configured to contain nitrogen gas and a thermal fluid.

In some embodiments, the vacuum pump is configured to move fluid from the process vessel to the first separation vessel, move fluid from the first separation vessel to the condenser, and move fluid from the condenser to the second separation vessel.

In some embodiments, the system weighs about 80,000 lbs or less.

In some embodiments, the system includes a skid. In some embodiments, the process vessel, the product shaping system, and the thermal fluid heater system are coupled to the skid.

In some embodiments, the system is configured to be transported from a first location to a second location.

In some embodiments, the system is configured to operate while the first modular unit is contained within the first housing and the second modular unit is contained within the second housing.

In some embodiments, each modular unit has dimensions of approximately 20'×8'×8'.

In some embodiments, the product shaping system includes an extrusion barrel, a reducer, and a die. In some embodiments, the extrusion barrel is coupled to the process vessel. In some embodiments, the extrusion barrel defines multiple annular spaces that are configured to allow a solid fuel composition to pass through the extrusion barrel. In some embodiments, the reducer is coupled to the extrusion barrel. In some embodiments, the reducer includes a thermal fluid piping configured to flow a thermal fluid, thereby providing heat to the solid fuel composition. In some embodiments, the die is coupled to the reducer. In some embodiments, the die defines multiple openings that are configured to shape the solid fuel composition as the solid fuel composition is extruded through the die.

The subject matter described in this disclosure can be implemented in particular embodiments, so as to realize one or more of the following advantages. In various embodiments, the mobile system provided herein can be used to transform a feedstock material into a more useful composition by modifying, reducing, and/or eliminating one or more characteristics and/or elements of the feedstock material. For example, in some embodiments, the mobile system provided herein can form a desired composition (e.g., a solid fuel composition) from a feedstock (e.g., solid waste) that reduces or eliminates odors, bacteria, and other undesirable properties of the feedstock. In some embodiments, the process vessel described herein transforms a feedstock material (e.g., solid waste) having a variable composition (e.g., a mixture of different types of solid waste) into a composition (e.g., a solid fuel composition) that is a relatively consistent (e.g., homogeneous), more compact (e.g., having a high density), and/or has a low moisture content (e.g., dry, <2 wt. % water).

In some embodiments, the mobile system provided herein can provide a solid fuel composition in the form of a homogenized, dry, dense, and energy-rich fuel primed for subsequent processing (e.g., pyrolysis or gasification). For example, the mobile system provided herein can produce a desired composition (e.g., a solid fuel composition) that provides efficient operation for subsequent processing (e.g., feedstock for a pyrolysis or gasification chamber as part of a waste-to-energy process) without additional capital investment in advanced machinery.

The mobile system provided herein can process solid waste mixtures without extensive presorting or predrying, as typically employed for producing an engineered fuel. Because the source material need not be dried or presorted (other than the optional removal non-combustibles of metal, glass, and hazardous materials), variations of content based on the site of origin, the season, or the weather do not substantially affect the process.

The process starts by obtaining a solid waste mixture which includes organic material, trash, and plastic. The mobile system processes the solid waste mixture in a process vessel, with the ability to drive away excess moisture, volatile organic compounds (VOCs), chlorinated organics, and chlorine gas, which are sequestered without exposure of these gasses to the atmosphere. The solid waste mixture can be processed in the process vessel at atmospheric pressure, below atmospheric pressure, or above atmospheric pressure. Then heat increases after removal of a substantial majority of the water in order to melt mixed plastics in the solid waste mixture and bring the material to a temperature at which mild torrefaction and thermal decomposition occur for some or all of the organic material. This process melts plastics content within the dried solid waste mixture, thereby distributing the plastic throughout the solid fuel composition and increasing the density of the solid fuel composition. The finished product has not been pyrolyzed and includes organic compounds and plastic. In some embodiments, the finished product is of a general uniform consistency, meaning that individual pieces of the solid fuel composition has a size that is substantially equal to an average particle size of the solid fuel composition. The finished product also has low water content (<1% wt., <2% wt., or <3% wt.), and is suitable for a variety of post-process applications, including use as fuel for combustion, or as a feedstock, for example, for a pyrolysis or gasification process.

Briefly, therefore, the present disclosure provides a mobile system that can produce a solid fuel composition with an energy content between about 8,000 BTU/lb. and about 14,000 BTU/lb., and a density between about 30 lbs./ft$^3$ and about 80 lbs./ft$^3$. The solid fuel composition is not pyrolyzed. The solid fuel composition comprises from about 40% wt. to about 80% wt. carbon, from about 5% wt. to about 20% wt. hydrogen, from about 5% wt. to about 20% wt. oxygen, less than about 2% wt. sulfur, less than about 2% wt. chlorine, and less than about 1% wt. water. The solid fuel composition is formed from a solid waste mixture without the formation of syngas (or with minimal formation of syngas) by heating a solid waste mixture comprising between about 5% wt. and about 60% wt. mixed plastics within a process vessel to a temperature of about 90° C. to about 110° C. to separate the solid waste mixture into a dried solid waste mixture and vaporized compounds released from the heated solid waste mixtures. Syngas is a product of pyrolysis, which does not occur in the present process. The vaporized compounds are removed from the process vessel to form a dried solid waste mixture. The dried solid waste mixture is heated and mixed to at least 160° C. and below atmospheric pressure to form a heated solid waste mixture comprising melted mixed plastics. The heated solid waste mixture is extruded below about 250° C. or below about 200° C. to produce an extruded solid waste mixture. The extruded solid waste mixture is cooled to less than about 65° C. to form the solid fuel composition.

The solid waste mixture may comprise municipal solid waste and agricultural waste. The solid waste mixture may comprise a sorted municipal solid waste produced by removing plastics and non-combustible wastes from municipal solid waste; and the amount of mixed plastics in the solid waste mixture may be adjusted to between about 5% wt. and about 60% wt. The solid waste mixture is substantially free of non-combustible waste, such as non-combustible metallic waste.

The mixed plastics may comprise one or more plastics selected from the group consisting of polyester, polyethylene terephthalate, polyethylene, polyvinyl chloride, polyvinylidene chloride, polypropylene, polystyrene, polyamides, acrylonitrile butadiene styrene, polyethylene/acrylonitrile butadiene styrene, polycarbonate, polycarbonate/acrylonitrile butadiene styrene, polyurethanes, maleimide/bismaleimide, melamine formaldehyde, phenol formaldehydes, polyepoxide, polyetheretherketone, polyetherimide, polyimide, polylactic acid, polymethyl methacrylate, polytetrafluoroethylene, and urea-formaldehyde. The mixed plastics may comprise polyvinyl chloride, polyvinylidene chloride, and combinations thereof, and the dried solid waste may be heated to at least about 160° C. or at least about 190° C. The solid waste mixture may comprise from about 5% wt. to about 35% wt. mixed plastics. The pressure maintained within the process vessel may be less than about 150 torr or less than about 50 torr. Alternatively, the solid fuel composition may comprise less than about 0.5% wt. water. The solid fuel composition may release per million BTUs when burned less than about 0.5 lb. alkali oxide, less than about 3 lb. ash, less than about 0.1 lb. $SO_2$, and less than about 1.5 lb. of chlorine. The solid fuel composition may be essentially non-porous, essentially odor-free, and/or essentially sterile. Further, the solid fuel composition may be extruded in the form of rods with a maximum cross-sectional dimension of about two inches and a rod length of less than about 2 feet. The solid fuel composition may be extruded in larger cylinder or rod forms. For example, in the case of cylinder forms, the solid fuel composition may be extruded to have a diameter of up to 20" or up to 10". The solid fuel composition may be extruded in other shapes, such as square or rectangular extrusion shapes. For example, in the case of square or rectangular extrusion shapes, the solid fuel composition may be extruded to have a cross-diagonal of up to 30" or up to 15". The solid fuel composition may be extruded through a die plate in which a series of small holes produces strands of solid fuel, which can then be cut at short intervals to produce small pieces of solid fuel. The solid fuel composition may be ground to a plurality of particles with a maximum particle dimension of less than about 3 mm.

In some embodiments, the solid fuel composition has an energy content between about 8,000 BTU/lb. and about 14,000 BTU/lb., and a density between about 30 lbs./ft$^3$ and about 80 lbs./ft$^3$. The solid fuel composition is not pyrolyzed and is substantially free of volatile organic compounds and non-combustible waste. The solid fuel composition comprises from about 40% wt. to about 80% wt. carbon, from about 5% wt. to about 20% wt. hydrogen, from about 5% wt. to about 20% wt. oxygen, less than about 2% wt. sulfur, less than about 2% wt. chlorine, and less than about 1% wt. water. The solid fuel composition comprises between about 5% wt. and about 35% wt. mixed plastics. The solid fuel composition releases per million BTUs burned less than about 0.5 lb. alkali oxide, less than about 3 lb. ash, less than about 0.1 lb. $SO_2$, and less than about 1.5 lb. of chlorine. The solid fuel composition is essentially non-porous, essentially odor-free, and essentially sterile. The solid fuel composition may be a non-waste, for example a non-waste produced from discarded non-hazardous secondary material.

In some embodiments, the solid waste mixture comprises between about 5% wt. and about 60% wt. mixed plastics and less than about 1% wt. water, being substantially free of volatile organic compounds, at a temperature between about 160° C. and about 260° C. and at a pressure of less than about 50 torr.

In some embodiments, the mobile system provided herein provides a suitable design for heating, mixing, drying, and/or extruding feedstock material(s). As mentioned above, the mobile system provided herein can include multiple modules. Each of the modules of the mobile system can individually fit within a standard shipping container (for example, a standard intermodal container having a volume holding capacity of about 20 feet long by about 8 feet wide by 8 feet high or a tall container whose height is greater than 8 feet). Each of the modules of the mobile system residing in separate shipping containers can be transported to a desired location. Once all of the modules are transported to the desired location, the modules can be connected together to form the system in preparation for producing the desired composition (e.g., a solid fuel composition). The modularized configuration of the mobile system provided herein can reduce the footprint (that is, required plot space) of the system in comparison to non-modularized systems. Once all of the modules are transported to the desired location, the modularized configuration of the mobile system provided herein can be installed more quickly and more easily in comparison to non-modularized systems, thereby reducing installation costs and mitigating safety risks associated with installation on site. In some embodiments, the mobile system provided herein includes a single module or multiple modules and can fit into a shipping container that is about 40 feet long by about 8 feet wide.

DETAILED DESCRIPTION

Figure 1:
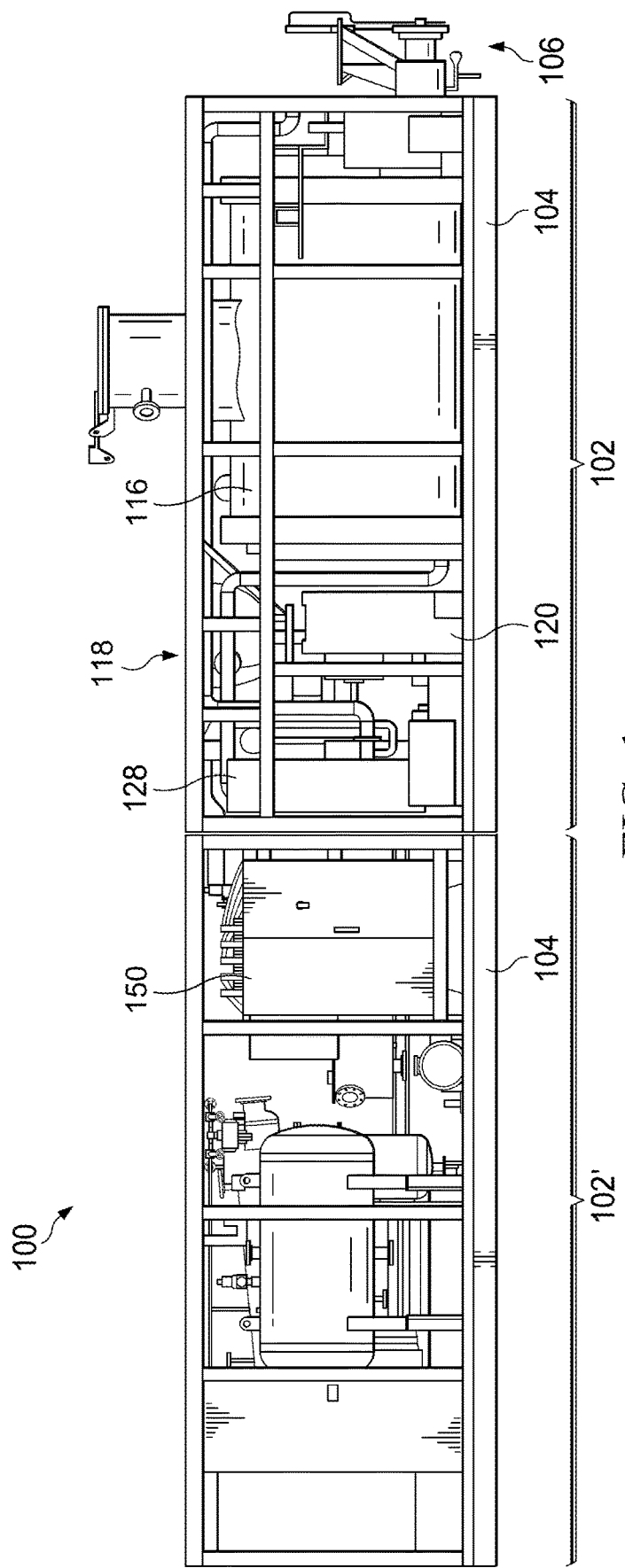
FIG. 1 is a first side cutaway view of an example of a mobile solid fuel production system.

The mobile solid fuel production systems described in this specification have a size, shape, and weight suitable for fitting into and being shipped in a shipping container having outer dimensions of about 20 feet by about 8 feet by about 8 feet. In one example, a shipping container has outer dimensions of about 19.5 feet by about 8 feet by about 8 feet, and a standard weight limit of about 20,000 pounds. The size, shape, and weight facilitate shipping and avoid the need for escort vehicles, or special permits, and higher shipping costs.

The materials processing, materials-to-fuel, or waste-to-fuel processing systems described in this specification are "mobile systems." Here, "mobile systems" generally refer to systems that can be moved from a first location to a second location, and run as a stand-alone system. For example, the mobile system provided herein can be moved from a first location to a second location and simply be provided utilities (such as power and cooling water) without requiring the additional installation of auxiliary equipment to produce a solid fuel composition from a solid waste mixture. In one example, a mobile solid fuel production system provides for fluid spill containment within the system. Mobile systems are configured to be placed and prepared into operational mode within 24 hours or 48 hours. Thus, a mobile solid fuel production system can be installed as a stand-alone unit at a disaster relief site, construction site, landfill/field site, or other site in the absence of a larger facility.

A mobile solid fuel production system, or any one or more of its components, provided herein can be powered by an electric, natural gas, kerosene, diesel, or oil power source. In some embodiments, a suitable source of electric power supplied to the system can include a generator.

A mobile solid fuel production system, or any one or more of its components, provided herein is configured for receiving a water from a water supply source. The system can have one or more connections and conduits for receiving water and/or removing water from the system. In some embodiments, the system does not require a constant water connection and supply. For example, in some embodiments, water can circulate through the system in a closed loop cycle with a heat exchanger within the system for a duration of time.

The mobile solid fuel production system is sized and shaped to have dimensions on the order of a shipping container (e.g., about 20'×8'×8' or about 40'×8'×8'). The processing volume of the mobile solid fuel production system is maximized within the selected volume. The weight of the system (e.g., about 20,000 lbs or less for 20'×8'×8') is advantageously compatible with standard shipping options. In some embodiments, the weight of the system can range from about 10,000 lbs to about 30,000 lbs, about 50,000 lbs to about 60,000 lbs, or about 30,000 lbs to about 40,000 lbs. In some embodiments, the weight of the system can be about 10,000 lbs or less, 20,000 lbs or less, about 30,000 lbs or less, about 40,000 lbs or less, about 50,000 or less, about 60,000 lbs or less, about 70,000 lbs or less, or about 80,000 lbs or less.

In some embodiments, the mobile solid fuel production system includes a module. In some embodiments, the mobile solid fuel production system includes multiple modules. Each module includes a housing. In some embodiments, each module is sized and shaped to fit within a shipping container. In such embodiments, each module is configured to operate once removed from the respective shipping container. In some embodiments, each module is sized and shaped to have dimensions on the order of a shipping container and can operate as a shipping container and therefore be transported from a first location to a second location without requiring the module to be placed within a shipping container. For example, the housing of the module can be a shipping container. In some embodiments, the housing includes removable panels. In some embodiments, each module is configured to be transported from the first location to the second location with the panels of the housing installed. In some embodiments, each module is configured to be transported from the first location to the second location with the panels of the housing removed.

The mobile solid fuel production system includes a thermal fluid heater system 150. The heater system 150 heats a thermal fluid, which circulates through a conduit system in the mobile solid fuel production system. A thermal fluid is a fluid that can be heated and flowed through the mobile solid fuel production system to provide heat to component(s) of the mobile solid fuel production system. In some embodiments, after the thermal fluid flows through component(s) of the mobile solid fuel production system, the thermal fluid is recirculated to the heater system 150, where the thermal fluid is re-heated so that it can be recycled and flow through the component(s) of the mobile solid fuel production system again. The thermal fluid can be, for example, a thermal oil. An expansion tank allows for the fluid to expand and contract as it heats and cools. Nitrogen gas is used in the conduit system to fill void space and allow the expansion tank to be placed within the heights of the conduit system, such that the expansion tank fits inside a "standard" or "high cube" shipping container. The expansion tank can contain the nitrogen gas and the thermal fluid. In some embodiments, the heater system 150 can be heated using an electric, natural gas, kerosene, diesel, or oil power source. In some embodiments, the heater system 150 includes a deaerator to remove vapor (such as nitrogen gas) from the thermal fluid. For example, vapor can be dissolved or entrained in the thermal fluid, and the deaerator can be used to remove such vapor from the thermal fluid.

During operation, heat is generated in the mobile solid fuel production system 100. The thermal fluid lines and the powertrains (gearboxes, motors, etc.) generate heat. For example, thermal fluid can provide heat, and the thermal fluid can flow through the mobile solid fuel production system 100. The mobile fuel production system includes an air handling system for processing or containing the heat. A duct or series of ducts draws the heat from each module and allows it to vent outside the system. For example, the system 100 includes multiple openings that allow for air circulation through the system.

Figure 2:
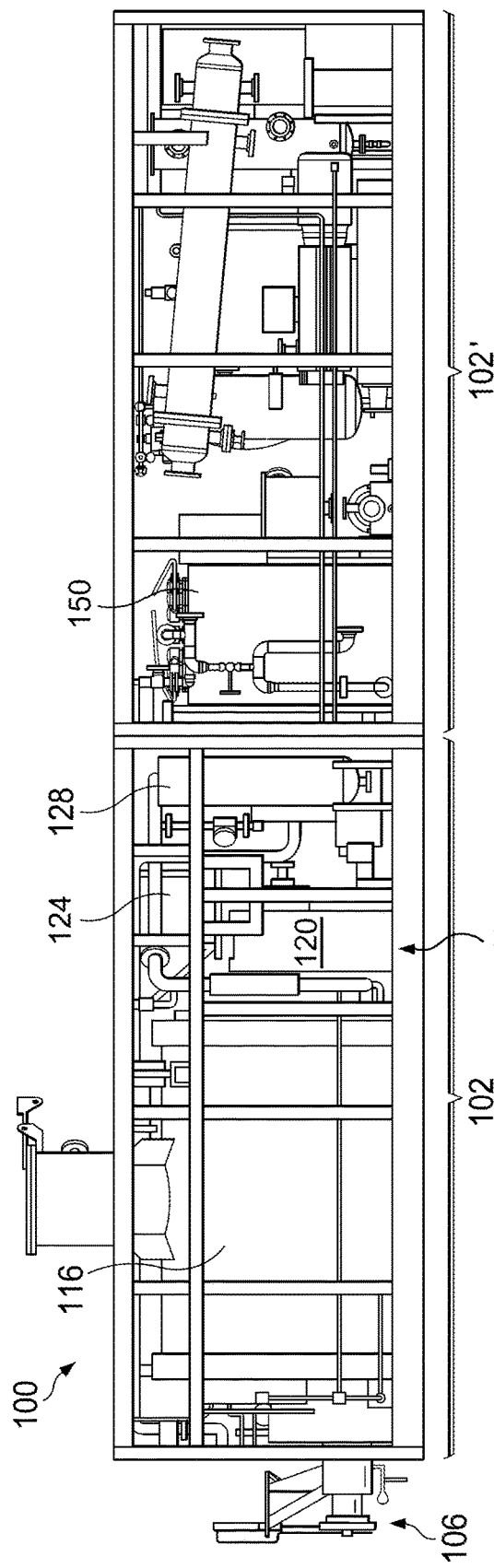
FIG. 2 is a second side cutaway view of the mobile solid fuel production system of FIG. 1.
Figure 3:
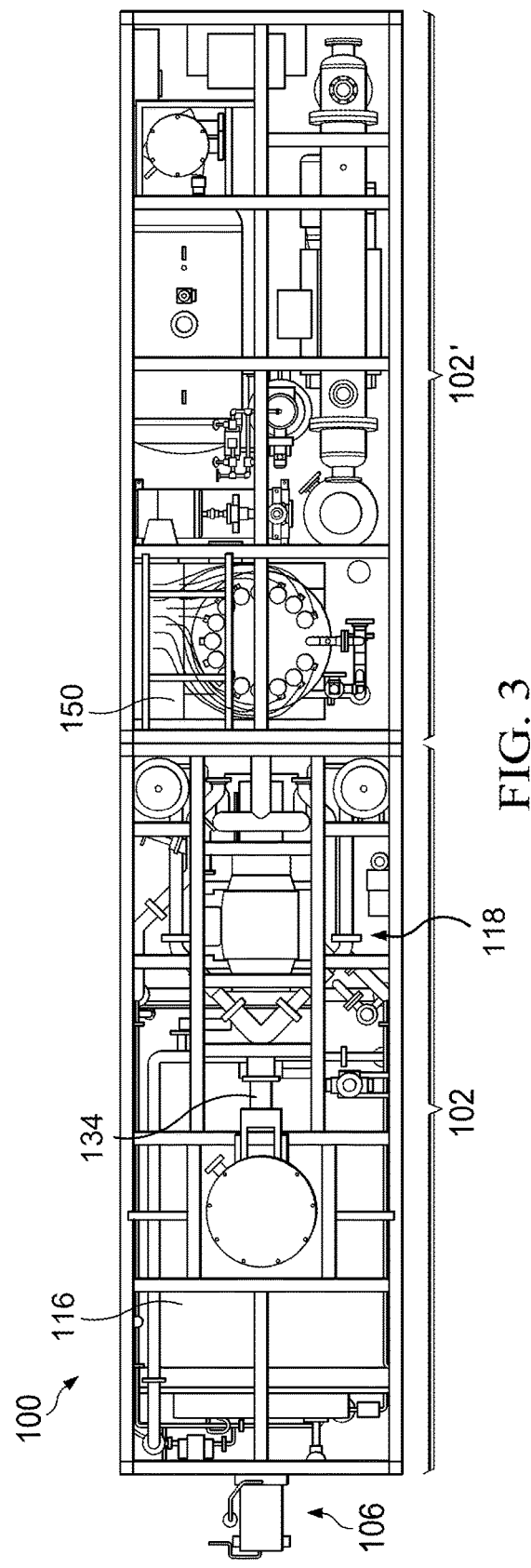
FIG. 3 is a top cutaway view of the mobile solid fuel production system of FIG. 1.

FIGS. 1-3 views of an example of a mobile fuel production system 100 including modules 102, 102'. FIG. 1 shows a cutaway view of modules 102, 102' from a first side. FIG. 2 shows a cutaway view of module 102 from a second side. FIG. 3 shows a cutaway view of modules 102, 102' from the top.

Each module 102, 102' includes a skid (floor) 104. In some embodiments, each skid 104 has a sloped bottom. The sloped bottom can direct spilled fluid to a low point of the skid 104 due to gravity. In some embodiments, each skid 104 includes a drain. The drain can collect spilled fluid on the skid 104. In some embodiments, the drain is included at the low point of the sloped bottom. To the left of the leftmost beam is shown the product shaping system 106. Conduit 110 is an exhaust valve for escaping steam. In some embodiments, each module 102, 102' includes a first opening and a second opening, such that air can flow through the modules 102, 102'. For example, air can flow into the module 102 through the first opening and exit the module 102 through the second opening and vice versa. In some embodiments, the first opening is located near the bottom of the module (102 or 102'), and the second opening is located at a ceiling of the module (102 or 102'). Product shaping system 106 includes an extrusion barrel 106a that can be coupled to a reducer (shown in FIG. 12 and described in more detail later) and die 106b to form the product into the desired shape. At the end of the die 106b, a plate with one or more openings is configured to further shape the solid fuel product. The solid fuel product is cut by a guillotine-style cutter, powered by air or hydraulic.

Mobile fuel production system 100 includes hydraulic motor 112. Rotary joints and reinforcements 114 hold the ends of the rotors. The feedstock is processed in process vessel 116. Process vessel 116 is typically cylindrical. The mobile fuel production system 100 includes an agitator rotor assembly. In some embodiments, the agitator rotor assembly includes multiple agitator rotors. Drivetrain 118 include gearboxes 120. An additional gearbox is on the other side of the system (not shown). Each gearbox 120 is coupled to an agitator rotor and is coupled to a corresponding motor 122.

Large single motor 124 powers a conveyor screw within the vessel. Gearboxes are coupled to appropriate equipment within the system and to a conveyor screw inside process vessel 116. Mobile fuel production system 100 includes two separation vessels 128. Inlet thermal fluid line 130 and outlet thermal fluid line 132 couple modules 102, 102'. Thermal fluid can flow through the agitator rotors. The thermal fluid can provide heat within the process vessel 116 (and in turn, to the solid composition within the process vessel 116) as the thermal fluid flows through the agitator rotors. In some embodiments, thermal fluid flows from inlet thermal fluid line 130 into one of the agitator rotors and then from the other agitator rotor to the outlet thermal fluid line 132. Exhaust line 134 is configured to transfer steam/condensate from process vessel 116. As depicted in FIG. 3, exhaust line 134 splits to connect to the separation vessels 128. The separation vessels 128 facilitate condensation, separation of liquid from vapor, and/or coalescence of liquid droplets from the exhaust of the process vessel 116. In some embodiments, the separation vessels 128 are knock-out pots. In some embodiments, the separation vessels 128 include filters. The outlet streams from the separation vessels 128 can combine and flow from module 102 to module 102'.

Feedstock (e.g., solid municipal waste) is provided to process vessel 116. Processed feedstock (solid fuel) from process vessel 116 is provided to product shaping system 106. Product shaping system 106 shapes (e.g., cuts) the solid fuel to yield a shaped solid fuel product. In some embodiments, feedstock can be added manually. Non-limiting methods for manually adding feedstock include use of a hopper, a chute, a motorized feeding system (e.g., a rotary airlock valve).

Figure 4:
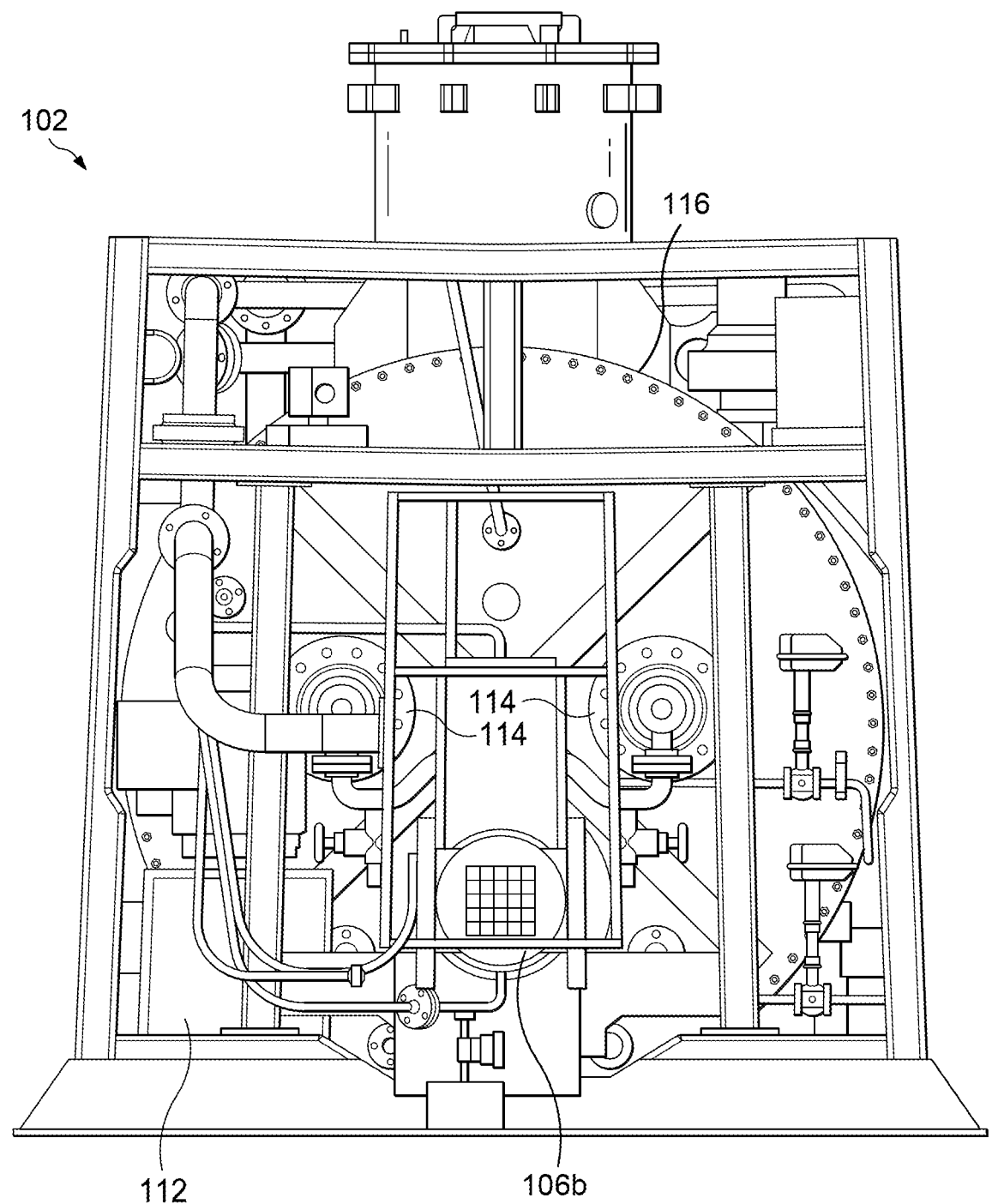
FIG. 4 is a first end cutaway view of a first skid of the mobile solid fuel production system of FIG. 1.
Figure 5:
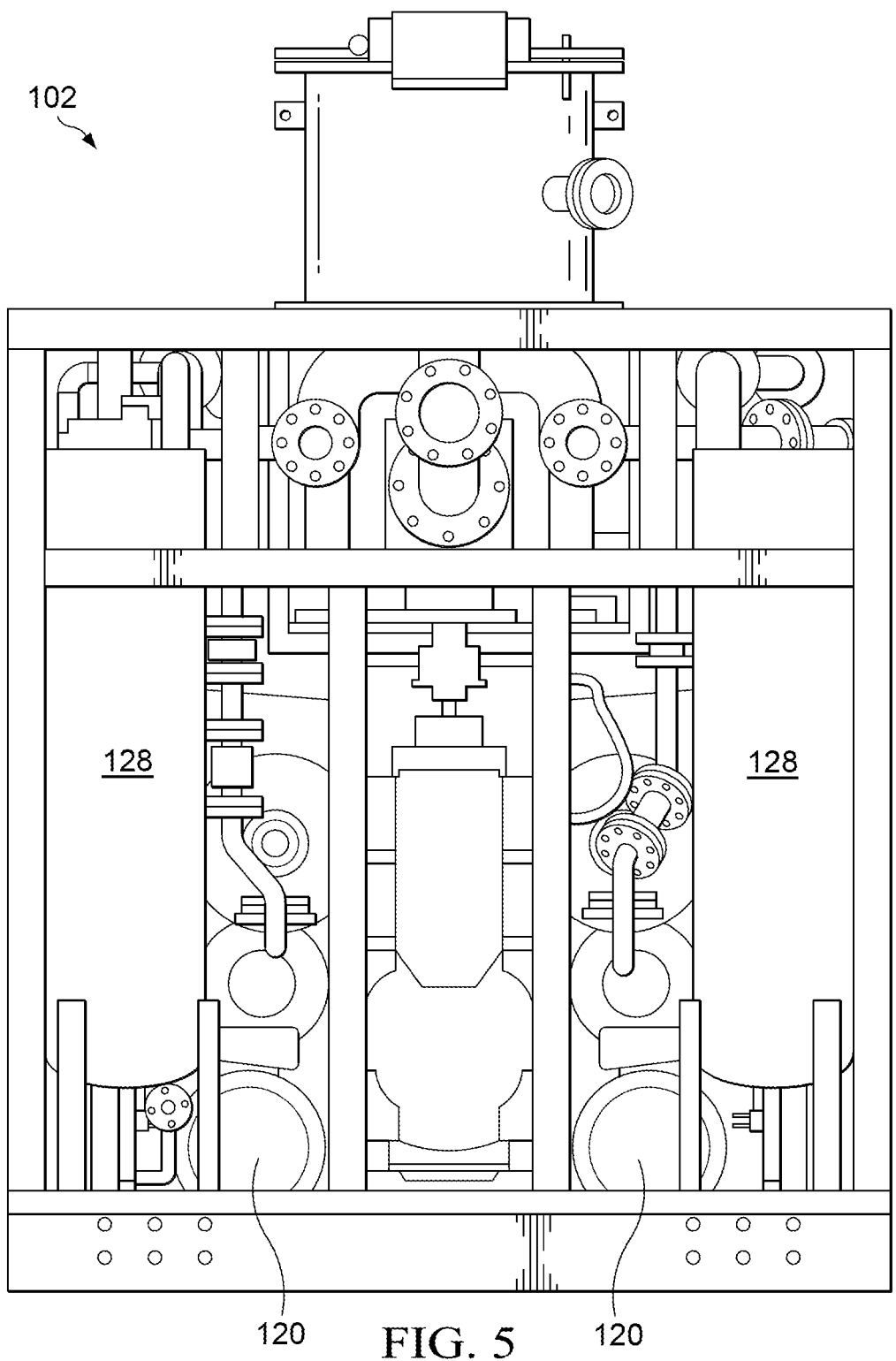
FIG. 5 is a second end cutaway view of the first skid of the mobile solid fuel production system of FIG. 1.
Figure 6:
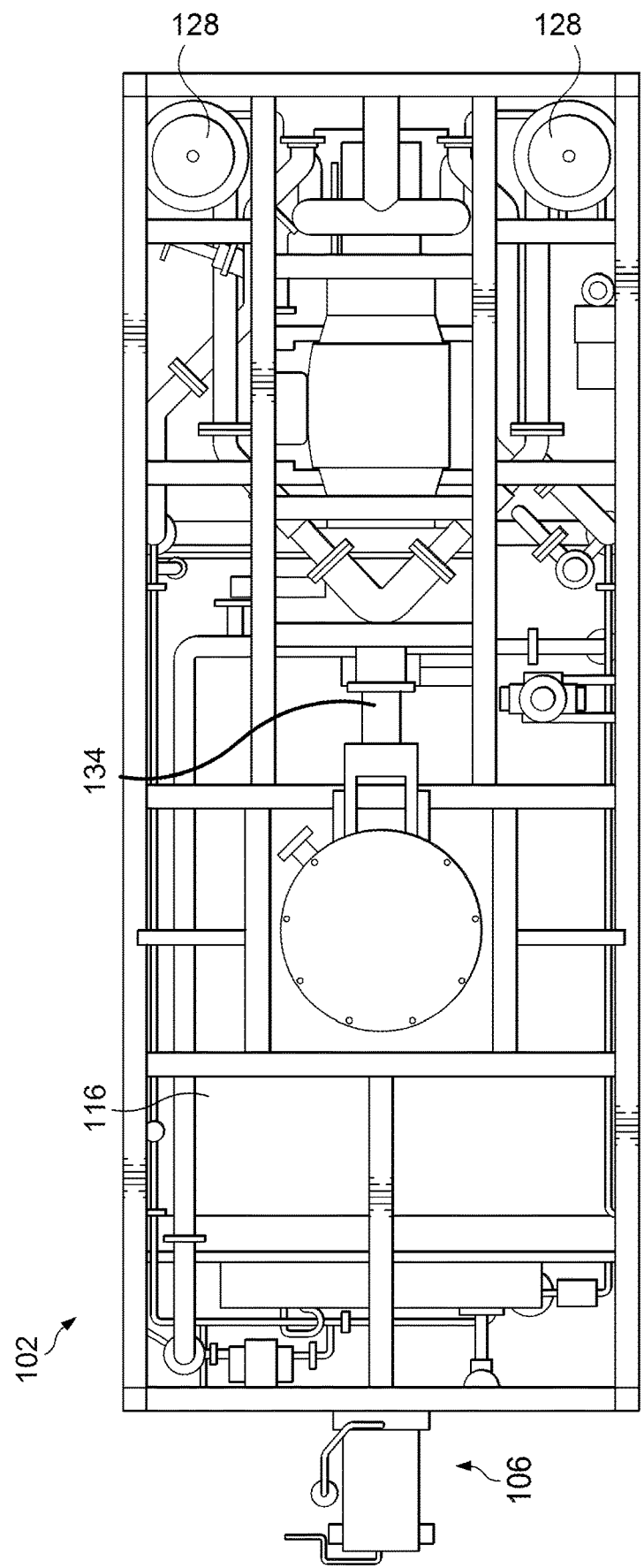
FIG. 6 is a top cutaway view of the first skid of the mobile solid fuel production system of FIG. 1.
Figure 7:
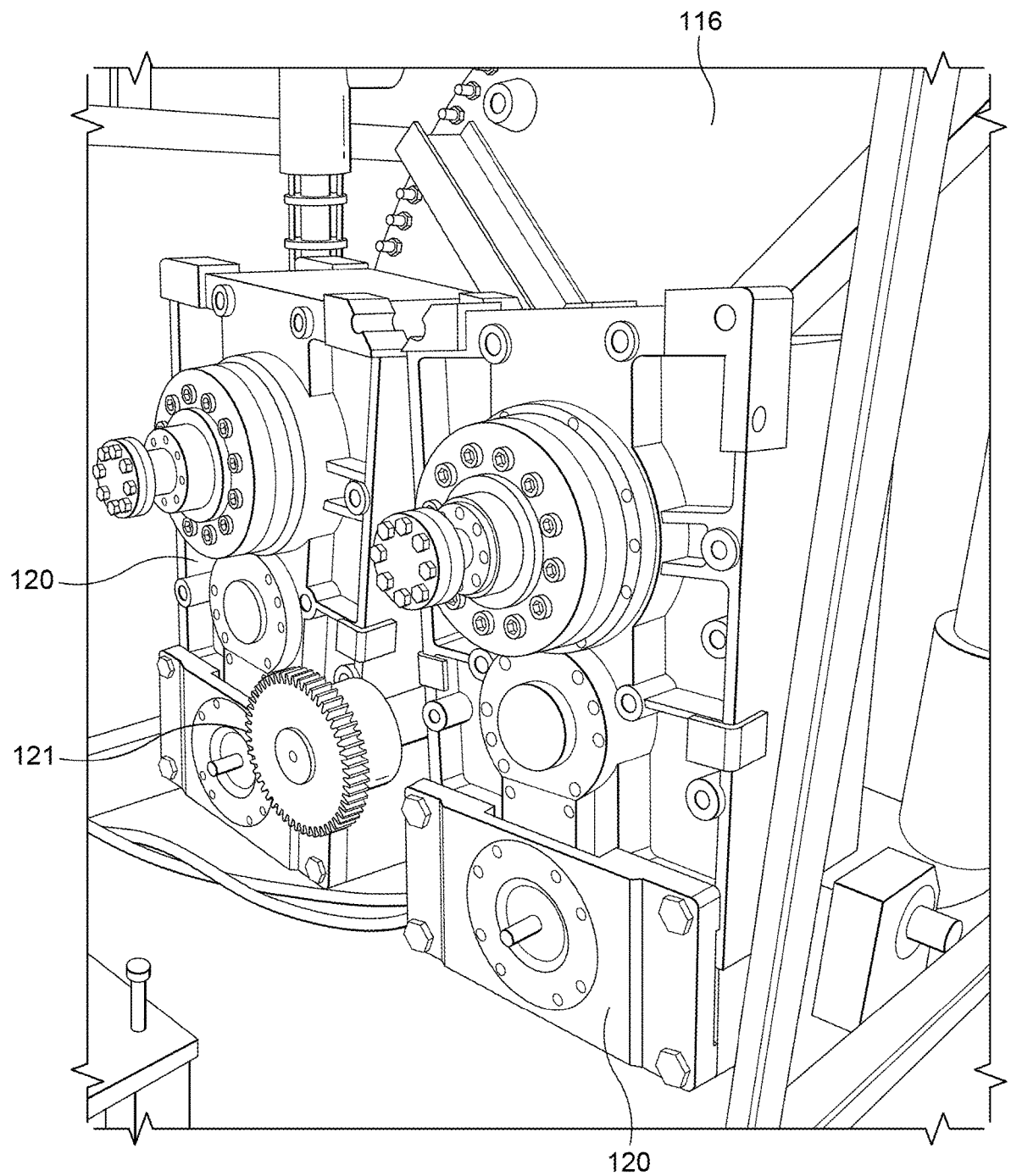
FIGS. 7 and 8 are perspective views of portions of the first skid of the mobile solid fuel production system of FIG. 1.
Figure 8:
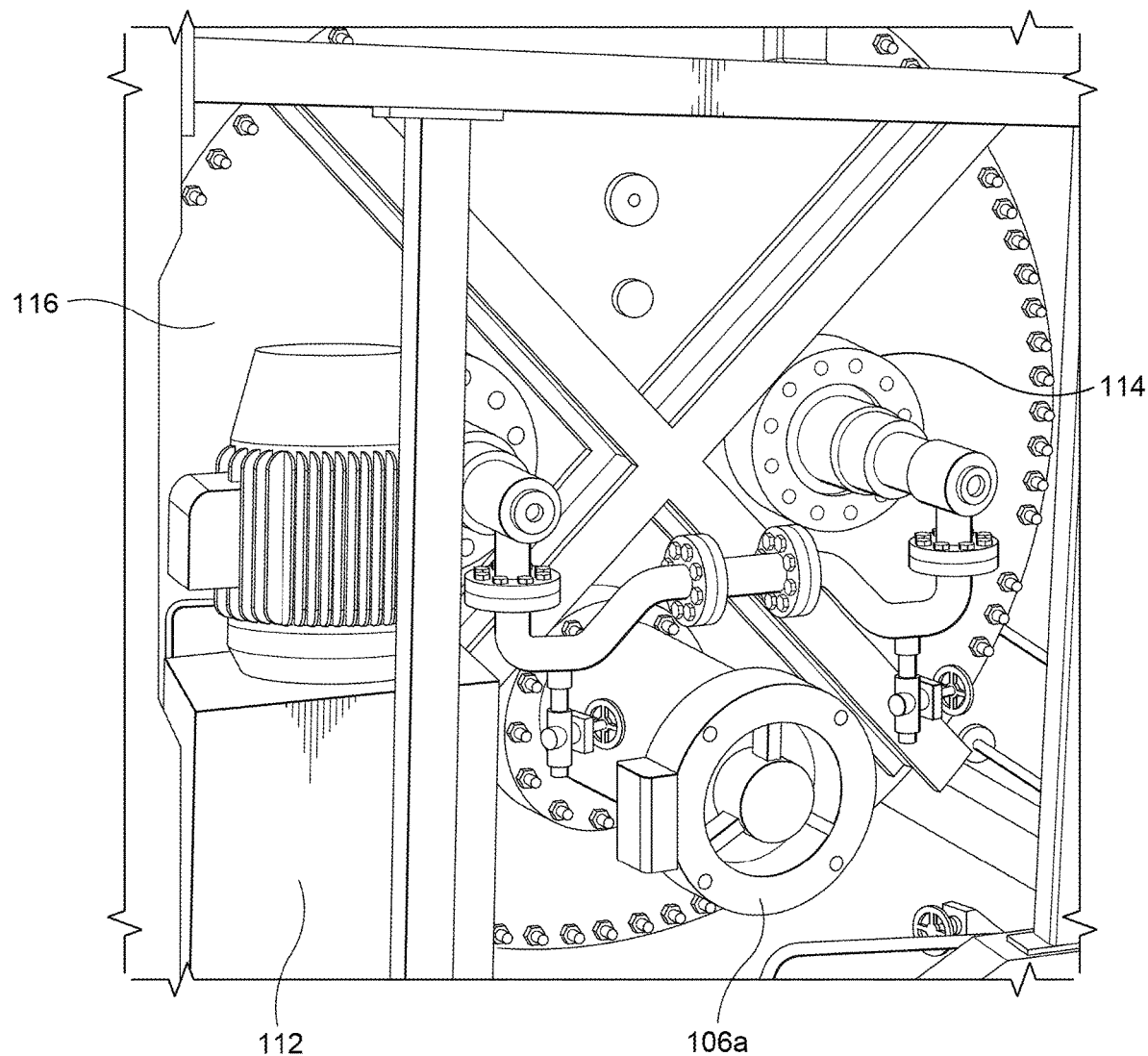
Figure 9A:
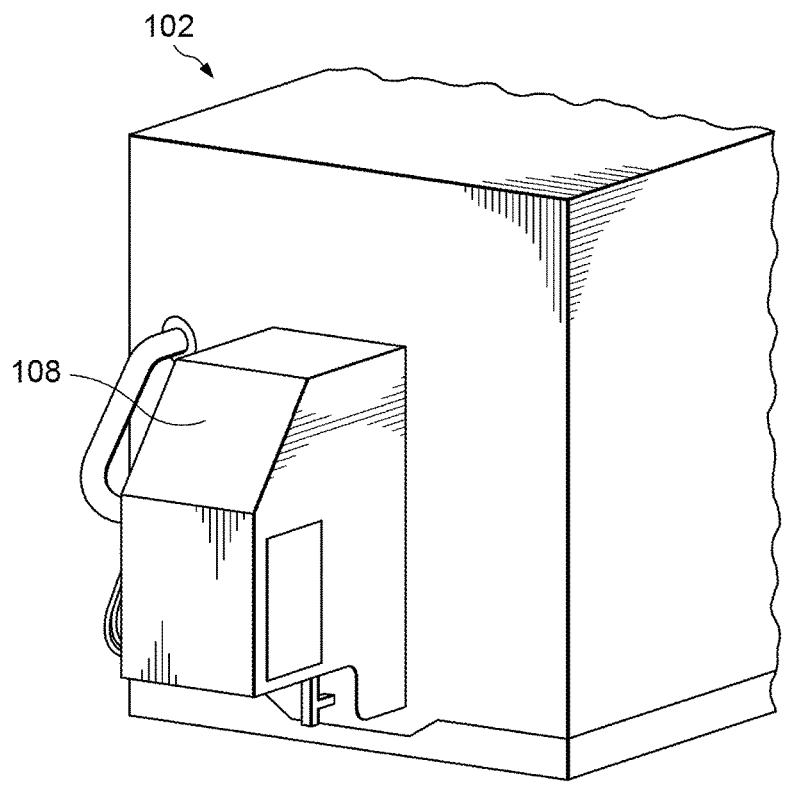
FIGS. 9A and 9B are perspective views of the first end of the mobile solid fuel production system of FIG. 1.
Figure 9B:
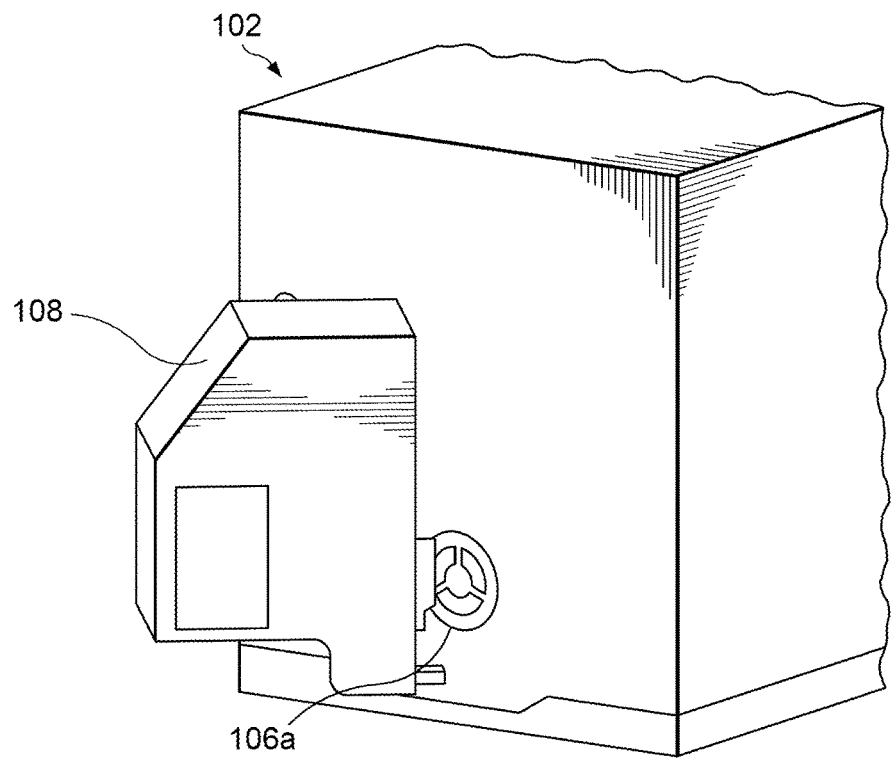

FIGS. 4-9 depict additional details of mobile fuel production system 100. FIG. 4 shows a cutaway view of module 102 from a first end. FIG. 5 shows a cutaway view of module 102 from a second end. FIG. 6 shows a cutaway view of module 102 from the top. FIG. 7 shows a portion of module 102 that includes gearboxes 120 and extrusion gear 121. The gearboxes 120 rotate the agitator rotors to facilitate agitation of the solid composition being processed within the process vessel 116. The extrusion gear 121 is used to rotate the extrusion screw to extrude the solid fuel product out of the process vessel 116. As depicted in FIG. 7, the gearboxes 120 deviate from a vertical orientation. For example, the gearboxes 120 are angled toward each other and toward a centerline of module 102. In some embodiments, each gearboxes 120 deviates from the vertical by an angle in a range of from 1 degree (°) to 30°. The angled orientations of the gearboxes 120 provide room for the extrusion gear 121 to be disposed between the gearboxes 120. In some cases, the orientation of the gearboxes 120 and extrusion gear 121 can protect them from heat exposure (for example, from the heated thermal fluid flowing through the system 100). FIG. 8 shows a portion of module 102 that includes an extrusion barrel 106a. As depicted in FIG. 8, the extrusion barrel 106a defines multiple annular spaces through which the solid fuel composition can be extruded from the process vessel 116. The configuration of the extrusion barrel 106a allows for the solid fuel composition to exit the process vessel 116 through the annular spaces while also structurally supporting component(s) of the product shaping system 106 (for example, the die 106b and/or the reducer 106c). FIGS. 9A and 9B show a perspective view of the first end of module 102 with a cover 108 in a closed position and an open position, respectively. As depicted in FIGS. 9A and 9B, the product shaping system 106 includes a hinge that allows the cover to be moved between open and closed positions.

The mobile fuel production system 100 can be made operational by installing a mechanism for introducing the feedstock. For example, in some embodiments, a hopper or chute or motorized feeding system may be added to the system. In some embodiments, no installations are needed to make the system operational because material can be manually loaded in.

The mobile fuel production system 100 can be made operational by connecting the system to a power source (e.g., an electrical source). A water inlet must be connected, which be a continuous source (such as a building's plumbing) or a closed loop. In various embodiments, a pipe (e.g., hose) is connected to the condensate/water recovery outlet.

Figure 10A:
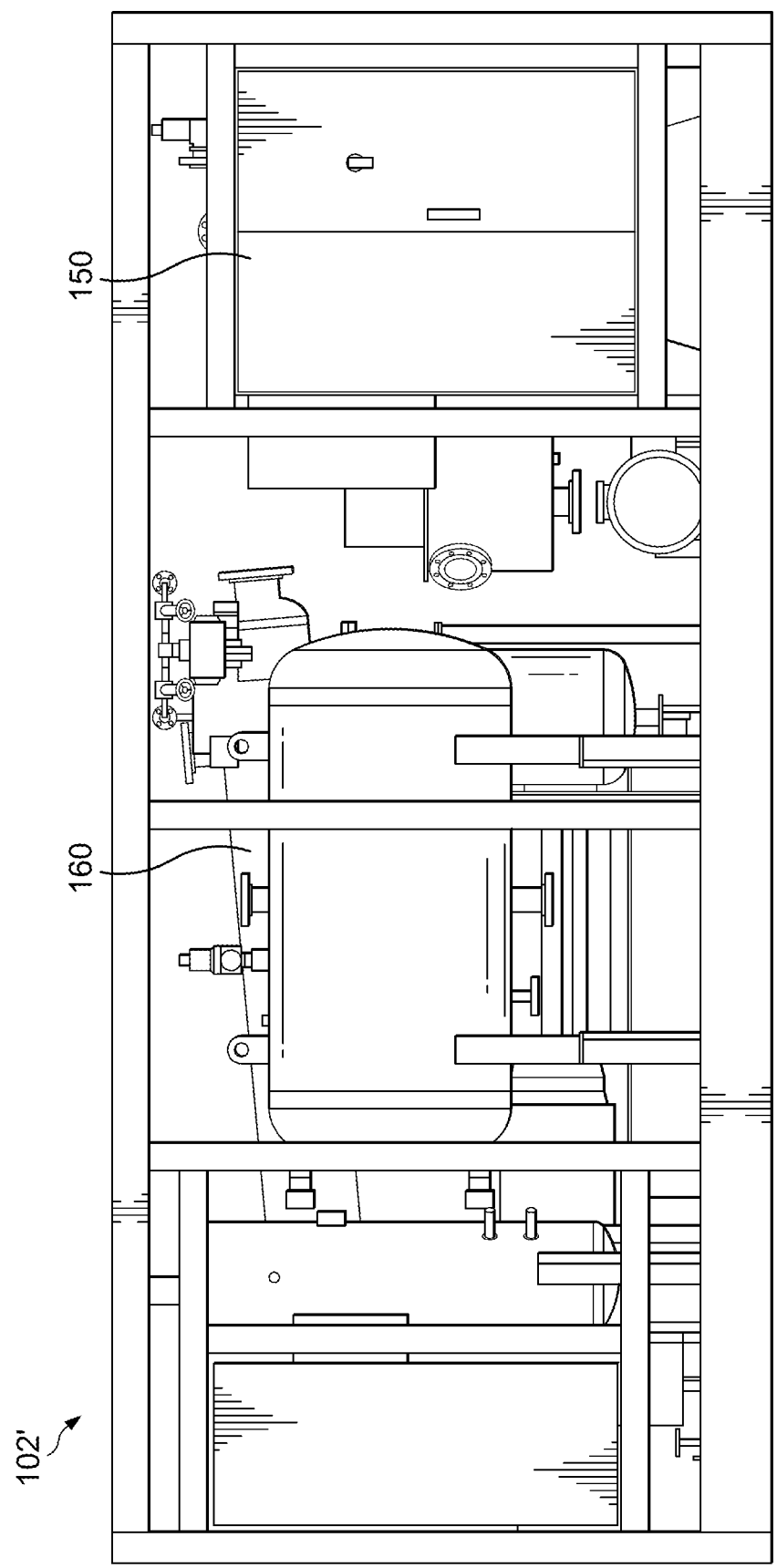
FIG. 10A is a first side cutaway view of a second skid of the mobile solid fuel production system of FIG. 1.
Figure 10B:
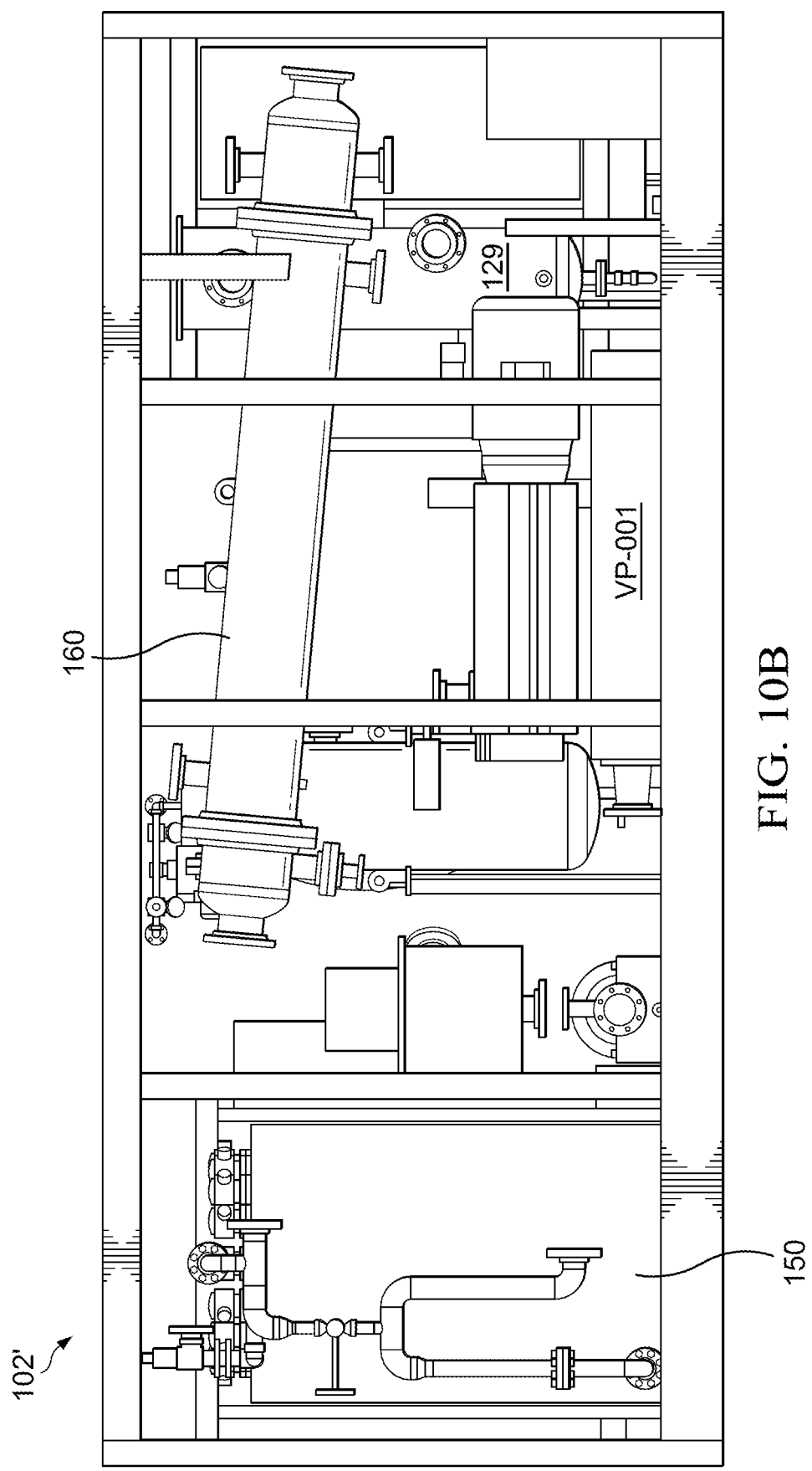
FIG. 10B is a second side cutaway view of the second skid of the mobile solid fuel production system of FIG. 1.
Figure 10C:
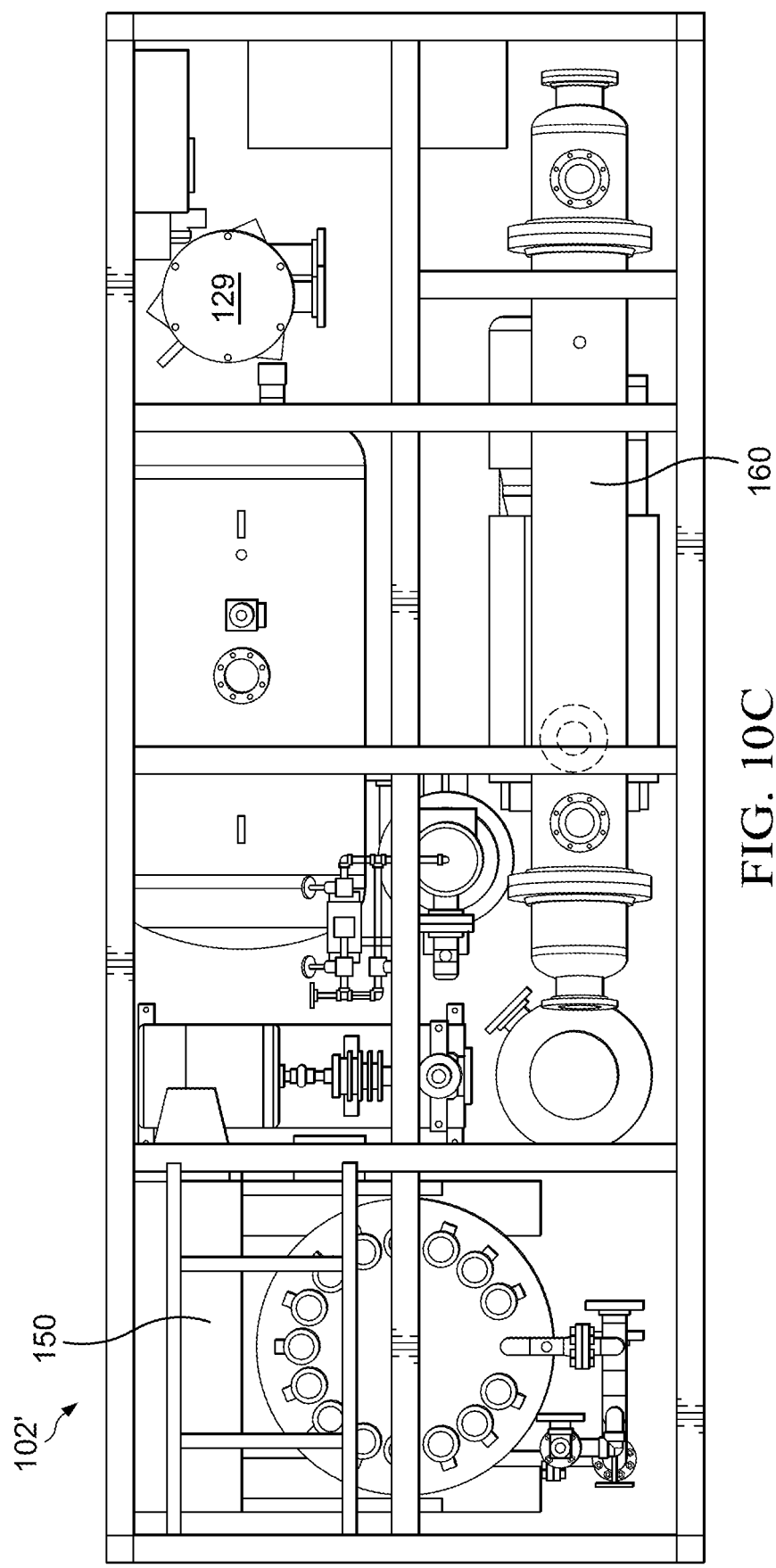
FIG. 10C is a top cutaway view of the second skid of the mobile solid fuel production system of FIG. 1.
Figure 10D:
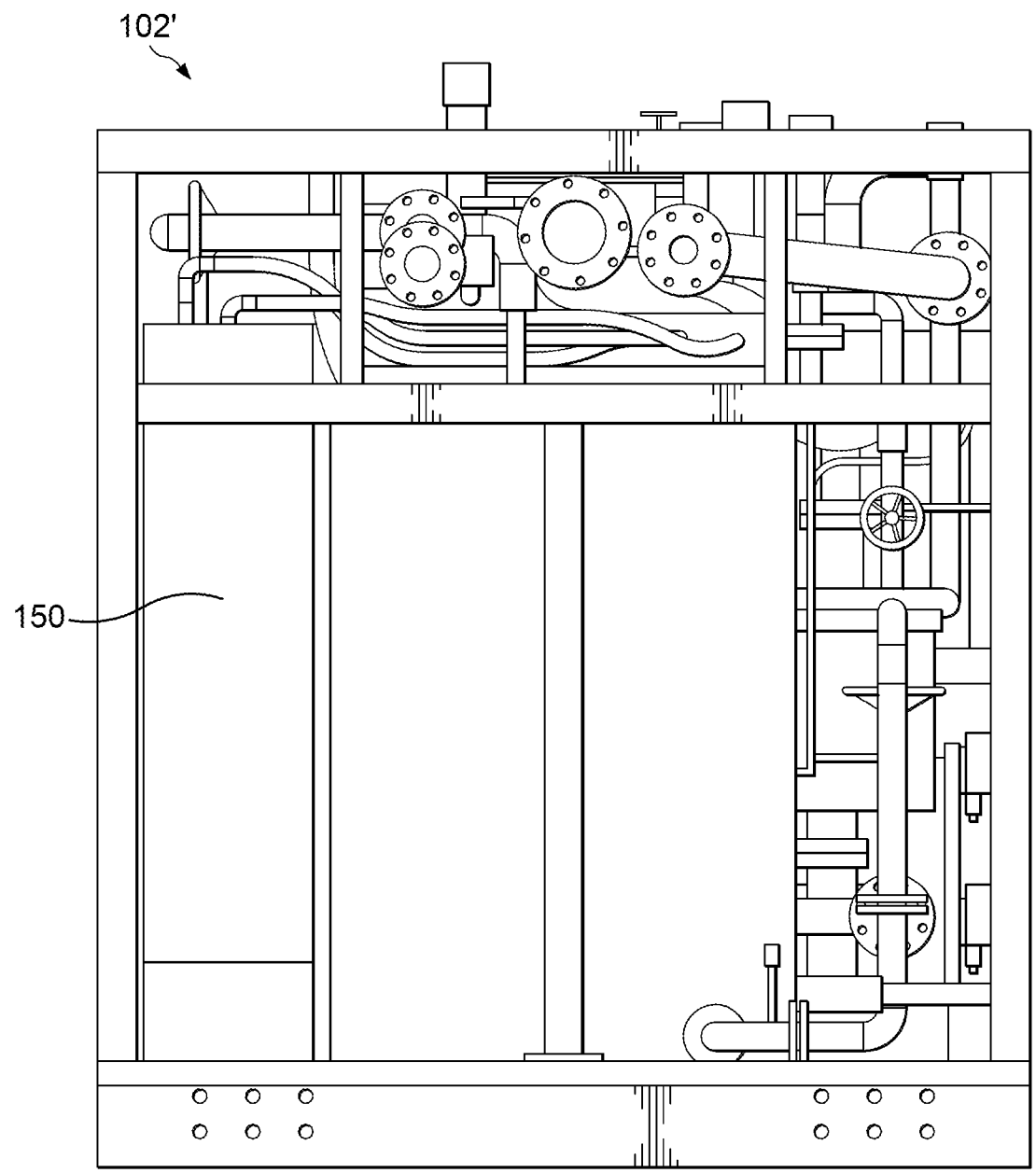
FIG. 10D is a first end cutaway view of the second skid of the mobile solid fuel production system of FIG. 1.
Figure 10E:
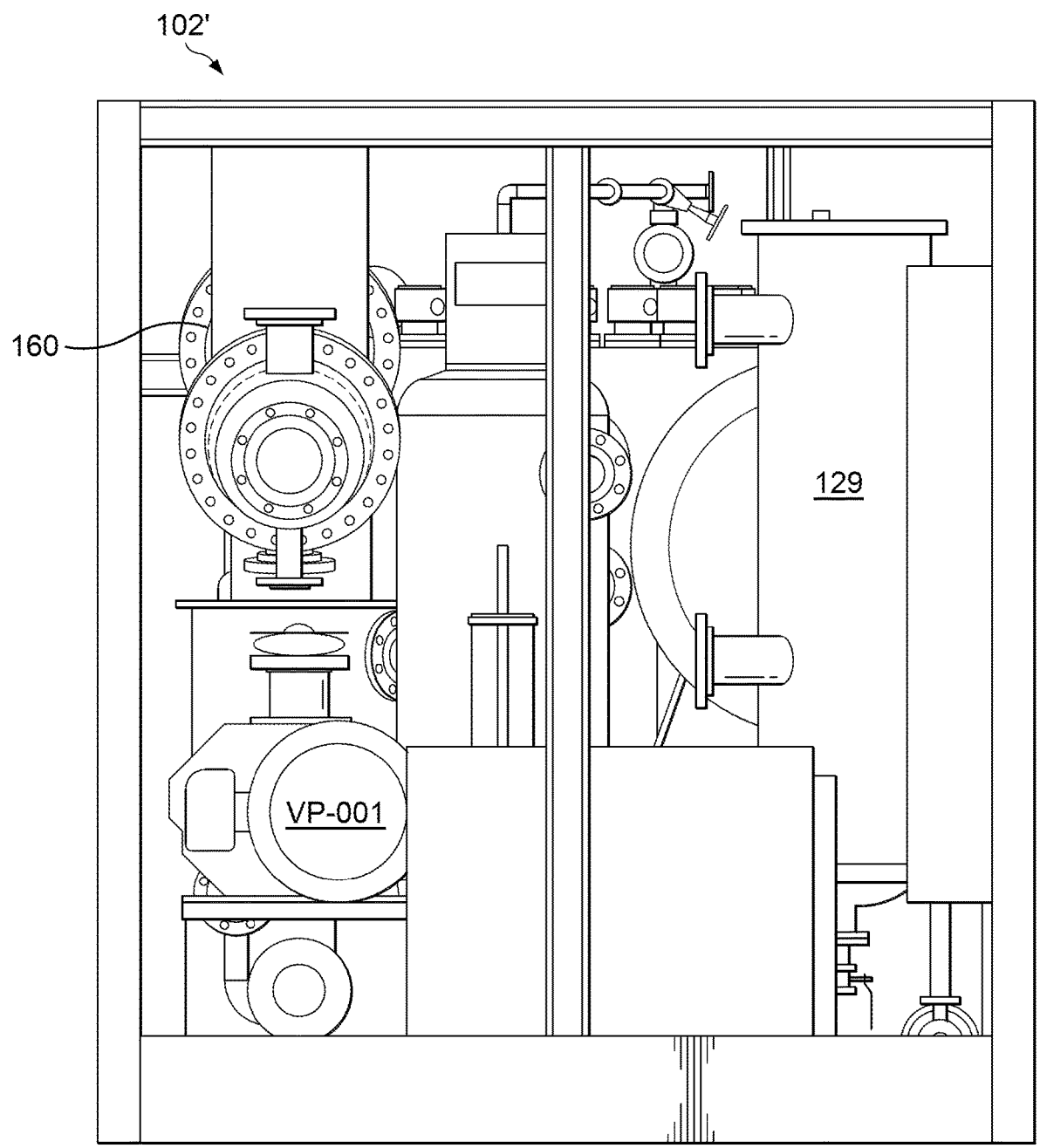
FIG. 10E is a second end cutaway view of the second skid of the mobile solid fuel production system of FIG. 1.
Figure 10F:
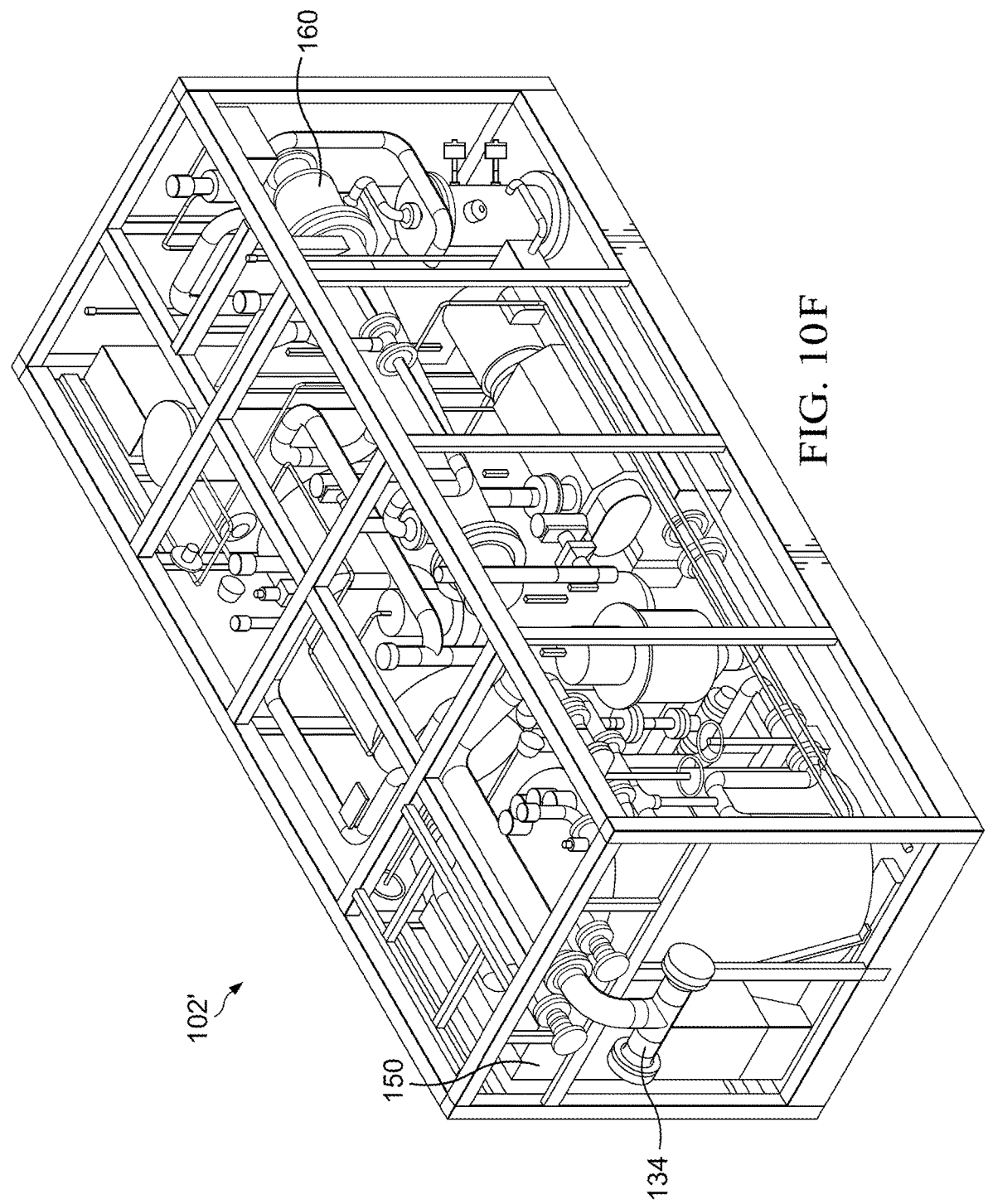
FIGS. 10F and 10G are perspective cutaway views of the second skid of the mobile solid fuel production system of FIG. 1.
Figure 10G:
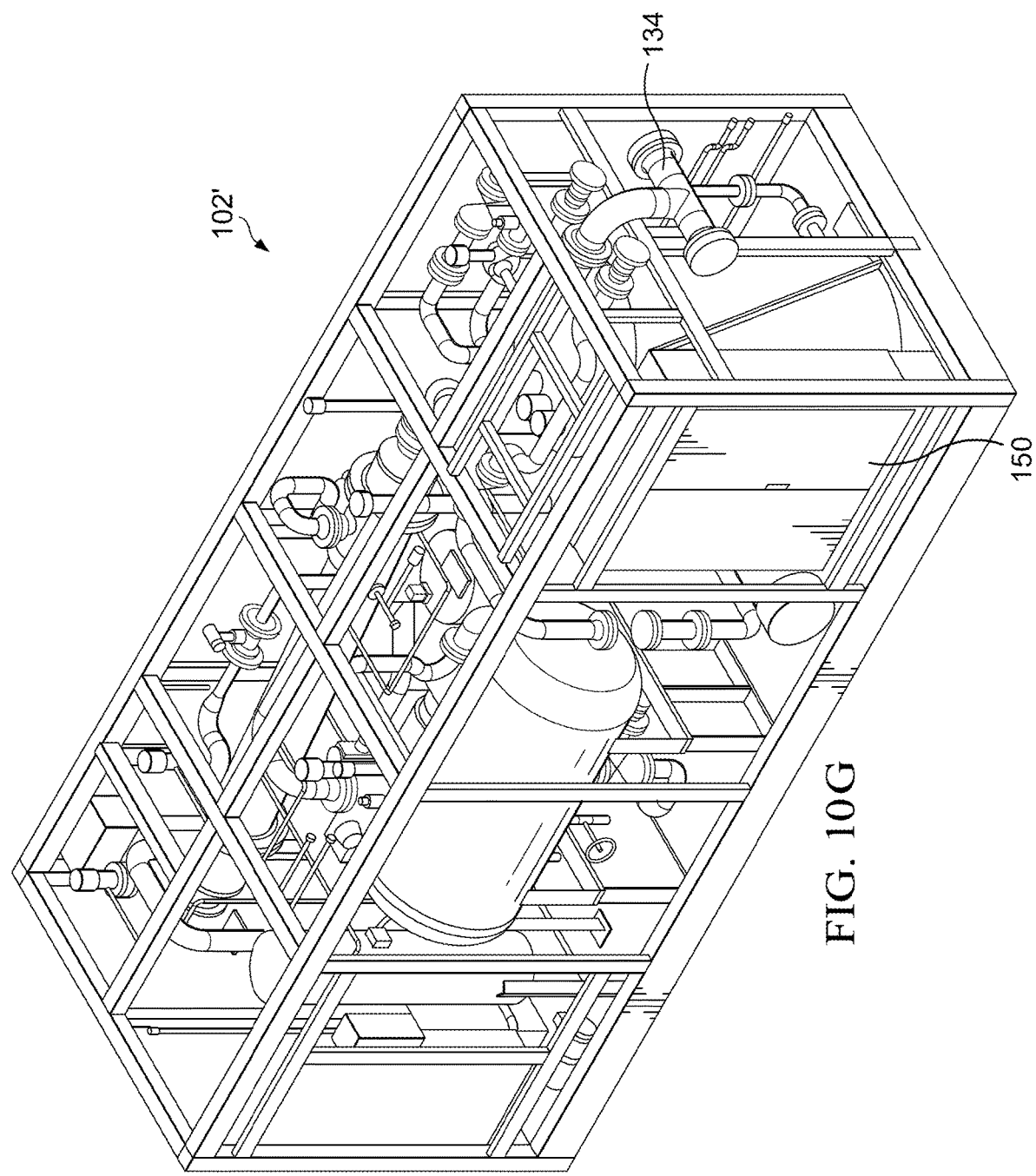

FIGS. 10A-10G depict additional details of mobile fuel production system 100. FIG. 10A shows a cutaway view of module 102' from a first side. FIG. 10B shows a cutaway view of module 102' from a second side. FIG. 10C shows a cutaway view of module 102' from the top. FIG. 10D shows a cutaway view of module 102' from a first end. FIG. 10E shows a cutaway view of module 102' from a second end. FIGS. 10F and 10G show cutaway perspective views of module 102'.

Figure 11:
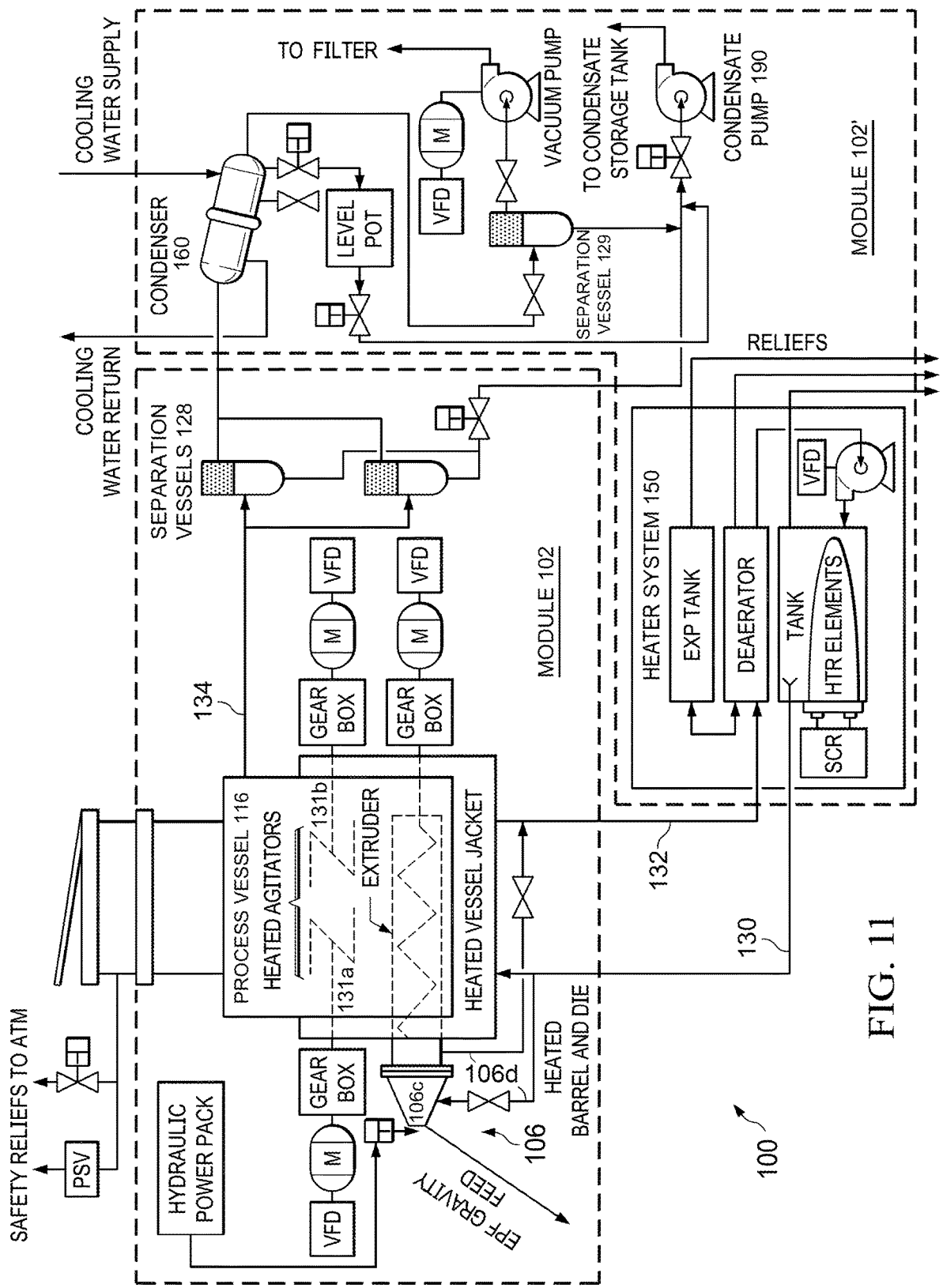
FIG. 11 is a schematic flow diagram of the mobile solid fuel production system of FIG. 1.

FIG. 11 is a schematic flow diagram of the mobile fuel production system 100. Thermal fluid (e.g., hot oil) is heated in heater system 150 positioned on module 102'. Heated thermal fluid flows from the heater system 150 to the agitator rotors on module 102 via inlet thermal line 130. Heated thermal fluid flows into at least one of the agitator rotors and provides heat within the process vessel 116 positioned on module 102. In some embodiments, heated thermal fluid flows through the agitator rotors in series (for example, through rotor 131a and then through 131b). In such embodiments, the heated thermal fluid enters rotor 131a, flows through rotor 131a, exits rotor 131a, enters rotor 131b, flows through rotor 131b, exits rotor 131b, and flows back to the heater system 150 on module 102' via outlet thermal fluid line 132. In some embodiments, heated thermal fluid flows through the agitator rotors in parallel (for example, a first portion of the heated thermal fluid flows through rotor 131a while a second portion of the heated thermal fluid flows through rotor 131b). In such embodiments, the heated thermal fluid splits, enters both agitator rotors 131a, 131b, flows through agitator rotors 131a, 131b, exits agitator rotors 131a, 131b, recombines, and flows back to the heater system 150 on module 102' via outlet thermal fluid line 132. The thermal fluid can flow through the agitator rotors 131a, 131b while the agitator rotors 131a, 131b are rotated by the respective gearboxes 120.

As the agitator rotors 131a, 131b rotate and provide heat within the process vessel 116, compounds can evaporate from the solid composition being agitated and heated within the process vessel 116. Vaporized compounds (e.g., steam/condensate) flow from the process vessel 116 through exhaust line 134 to separation vessels 128. As mentioned previously, the exhaust line 134 splits the exhaust flow between two separation vessels 128. Condensate can be knocked out from the exhaust line within the separation vessels 128. Because the separation vessels 128 can remove component(s) from the fluid stream flowing from the process vessel 116, the fluid stream entering each separation vessel 128 may have a different composition from the vapor stream exiting the respective separation vessel 128. In some embodiments, condensate outlets of the separation vessels 128 are combined and flowed to a condensate storage tank by a condensate pump 190 positioned on module 102'. In some embodiments, the condensate storage tank is positioned on module 102'.

The condenser 160 is supplied with a coolant (e.g., cooling water) to provide cooling to the vapor flowing from the separation vessels 128. As the vapor flows through the condenser 160, compounds may condense to form condensate. Vapor from the condenser 160 can flow through an additional separation vessel 129. The separation vessel 129 facilitates condensation, separation of liquid from vapor, and/or coalescence of liquid droplets from the stream exiting the condenser 160. In some embodiments, the separation vessel 129 is a knock-out pot or a cyclonic separator. In some embodiments, the separation vessel 129 includes a filter. In some embodiments, the vapor inlet to the separation vessel 129 is a tangential inlet, which can facilitate centrifugal separation of vapor and liquid within the separation vessel 129. Because the separation vessel 129 can remove component(s) from the fluid stream flowing from the condenser 160, the fluid stream entering the separation vessel 129 may have a different composition from the vapor stream exiting the separation vessel 129. Condensate knocked out within the separation vessel 129 can combine with condensate from the separation vessels 128 and the condensate from the condenser 160 and be pumped to the condensate storage tank by the condensate pump 190.

The vapor flow of the exhaust from the process vessel 116, through the separation vessels 128, condenser 190, and separation vessel 129 is facilitated by the vacuum pump VP-001. In some embodiments, vapor from the separation vessel 129 flows through vacuum pump VP-001 to an adsorption filter. In some embodiments, the adsorption filter is positioned on module 102'.

Figure 12:
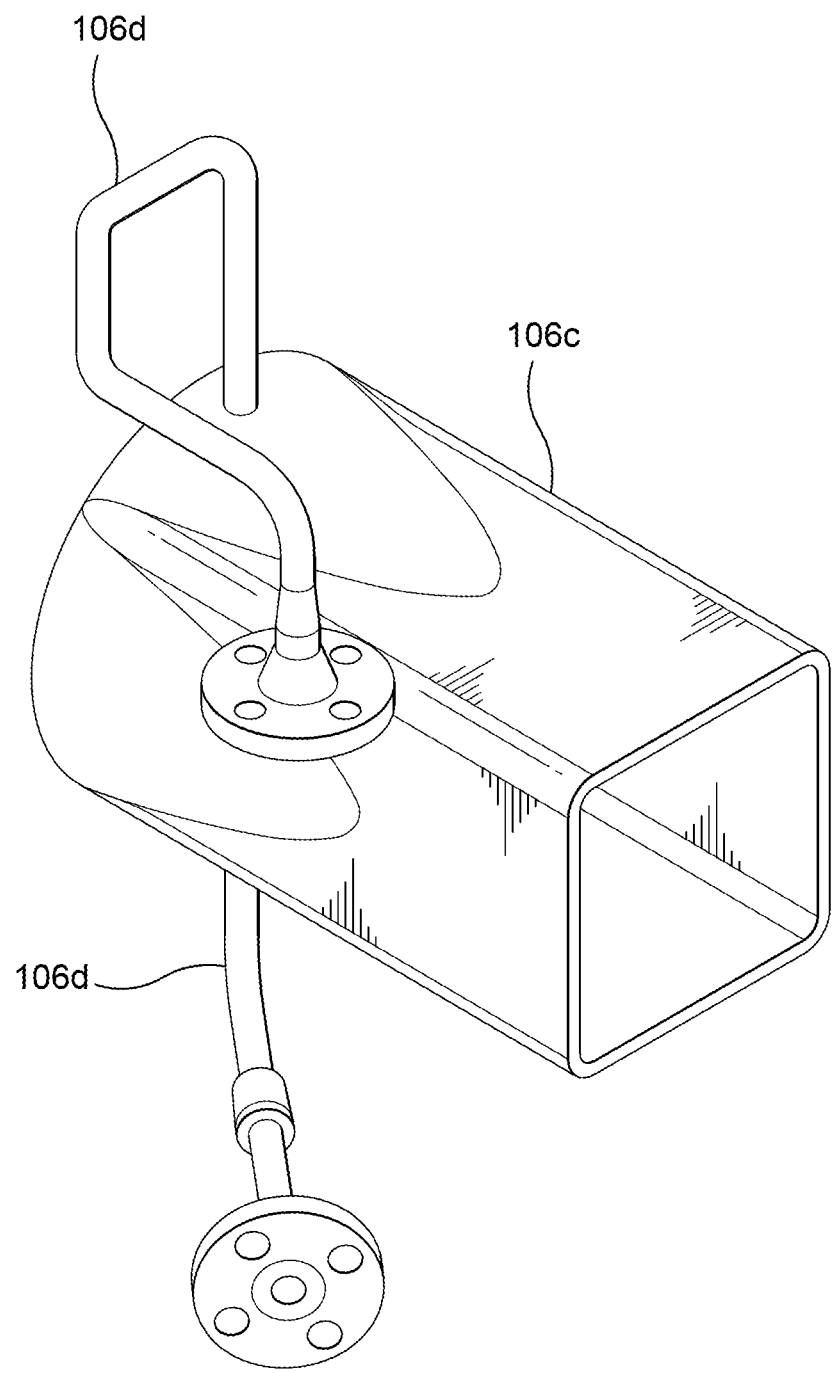
FIG. 12 is a perspective view of a reducer of the mobile solid fuel production system of FIG. 1.

FIG. 12 is a perspective view of a reducer 106c that can be coupled to the extrusion barrel 106a of the product shaping system 106. In some embodiments, the reducer 106c has a first end shaped to couple to the extrusion barrel 106a. In some embodiments, the reducer 106c has a second end shaped to couple to the die 106b. In some embodiments, the product shaping system 106 includes thermal fluid piping 106d which can be used to flow thermal fluid and provide heat as the solid fuel moves through the product shaping system 106. For example, the thermal fluid piping 106d can branch from the inlet thermal fluid line 130 and branch into the outlet thermal fluid line 132.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

The details of one or more embodiments of the subject matter of this disclosure are set forth in the accompanying drawings and the description. Other features, aspects, and advantages of the subject matter will become apparent from the description, the drawings, and the claims.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A fuel production system comprising:
   a first modular unit comprising:
      a first housing;
      a process vessel;
      an agitator rotor assembly passing through the process vessel;
      a first drivetrain coupled to the agitator rotor assembly and configured to rotate the agitator rotor assembly;
      an extrusion screw passing through the process vessel;
      a second drivetrain coupled to the extrusion screw and configured to rotate the extrusion screw;
      a first separation vessel in fluid communication with the process vessel; and
      a product shaping system,
      wherein at least a portion of the process vessel is contained in the first housing, at least a portion of the agitator rotor assembly is contained in the first housing, at least a portion of the first drivetrain is contained in the first housing, at least a portion of the extrusion screw is contained in the first housing, at least a portion of the second drivetrain is contained in the first housing, at least a portion of the first separation vessel is contained in the first housing, and at least a portion of the product shaping system is contained in the first housing; and
   a second modular unit configured to be coupled to the first modular unit, the second modular unit comprising:
      a second housing;
      a thermal fluid heater system configured to be in fluid communication with the process vessel;
      a condenser configured to be in fluid communication with the first separation vessel;
      a second separation vessel in fluid communication with the condenser; and
      a vacuum pump in fluid communication with the second separation vessel,
      wherein at least a portion of the thermal fluid heater system is contained in the second housing, at least a portion of the condenser is contained in the second housing, at least a portion of the second separation vessel is contained in the second housing, and at least a portion of the vacuum pump is contained in the second housing.

2. The system of claim 1, wherein the thermal fluid heater system comprises an expansion tank, a heater, a deaerator, and a conduit system.

3. The system of claim 2, wherein the expansion tank is configured to contain a gas and a thermal fluid.

4. The system of claim 1, wherein the vacuum pump is configured to move fluid from the process vessel to the first separation vessel, move fluid from the first separation vessel to the condenser, move fluid from the condenser to the second separation vessel, or any combination thereof.

5. The system of claim 1, wherein the system weighs about 80,000 lbs or less.

6. The system of claim 1, further comprising a skid, wherein the process vessel, the product shaping system, and the thermal fluid heater system are coupled to the skid.

7. The system of claim 1, wherein the system is configured to be transported from a first location to a second location.

8. The system of claim 1, wherein the system is configured to operate while the first modular unit is contained within the first housing and the second modular unit is contained within the second housing.

9. The system of claim 1, wherein each modular unit has dimensions of approximately 20'×8'×8'.

10. The system of claim 1, wherein the product shaping system comprises:
    an extrusion barrel coupled to the process vessel, the extrusion barrel defining a plurality of annular spaces configured to allow a solid fuel composition to pass through the extrusion barrel;
    a reducer coupled to the extrusion barrel, the reducer comprising a thermal fluid piping configured to flow a thermal fluid, thereby providing heat to the solid fuel composition; and
    a die coupled to the reducer, the die defining a plurality of openings configured to shape the solid fuel composition as the solid fuel composition is extruded through the die.

11. A modular fuel production system comprising:
    modules, each module comprising the fuel production system of claim 1, and wherein each module is configured to be removably coupled to one or more other modules.

12. A fuel production system comprising:
    a first modular unit comprising;
       a first housing:
       a process vessel configured to receive a solid mixture;
       an agitator rotor assembly passing through the process vessel, the agitator rotor assembly configured to agitate the solid mixture within the process vessel in response to being rotated, the agitator rotor assembly defining an inner bore configured to receive a thermal fluid and flow the thermal fluid through at least a portion of the agitator rotor assembly;
       a first drivetrain coupled to the agitator rotor assembly and configured to rotate the agitator rotor assembly;
       an extrusion screw passing through the process vessel, the extrusion screw configured to extrude a solid fuel composition from the process vessel in response to being rotated, the solid fuel composition formed from the solid mixture;
       a second drivetrain coupled to the extrusion screw and configured to rotate the extrusion screw;
       a first separation vessel in fluid communication with the process vessel; and
       a product shaping system comprising:
          an extrusion barrel coupled to the process vessel, the extrusion barrel defining a plurality of annular spaces configured to allow the solid fuel composition to pass through the extrusion barrel;
          a reducer coupled to the extrusion barrel, the reducer comprising a thermal fluid piping configured to flow the thermal fluid, thereby providing heat to the solid fuel composition; and
          a die coupled to the reducer, the die defining a plurality of openings configured to shape the solid fuel composition as the solid fuel composition is extruded through the die,
       wherein at least a portion of the process vessel, at least a portion of the agitator rotor assembly is contained in the first housing, at least a portion of the first drivetrain is contained in the first housing, at least a portion of the extrusion screw is contained in the first housing, at least a portion of the second drivetrain is contained in the first housing, at least a portion of the first separation vessel is contained in the first housing, and at least a portion of the product shaping system is contained in the first housing.

13. The fuel production system of claim 12, further comprising a second modular unit configured to be coupled to the first modular unit, the second modular unit comprising:

a second housing;
a thermal fluid heater system configured to be in fluid communication with the process vessel;
a condenser configured to be in fluid communication with the first separation vessel;
a second separation vessel in fluid communication with the condenser; and
a vacuum pump in fluid communication with the second separation vessel,
wherein at least a portion of the thermal fluid heater system is contained in the second housing, at least a portion of the condenser is contained in the second housing, at least a portion of the second separation vessel is contained in the second housing, and at least a portion of the vacuum pump is contained in the second housing.

* * * * *